US 008851709B2

(12) United States Patent
Feinbloom et al.

(10) Patent No.: US 8,851,709 B2
(45) Date of Patent: Oct. 7, 2014

(54) REMOTE CONTROL OF ILLUMINATING HEADLAMP

(75) Inventors: Richard E. Feinbloom, New York, NY (US); Ken Braganca, Ronkonkoma, NY (US); Kenneth Koscheka, Wading River, NY (US)

(73) Assignee: Designs for Vision, Inc., Lake Ronkonkoma, NY (US)

( * ) Notice: Subject to any disclaimer, the term of this patent is extended or adjusted under 35 U.S.C. 154(b) by 288 days.

(21) Appl. No.: 13/468,613

(22) Filed: May 10, 2012

(65) Prior Publication Data

US 2012/0275140 A1 Nov. 1, 2012

Related U.S. Application Data

(63) Continuation-in-part of application No. 12/658,025, filed on Feb. 1, 2010, now Pat. No. 8,215,791, which is a continuation of application No. 12/074,370, filed on Mar. 3, 2008, now Pat. No. 7,690,806.

(60) Provisional application No. 60/921,150, filed on Mar. 30, 2007.

(51) Int. Cl.
*F21L 4/00* (2006.01)
*H05B 37/02* (2006.01)
*F21V 14/04* (2006.01)
*F21L 14/00* (2006.01)
*F21V 23/04* (2006.01)
*H05B 33/08* (2006.01)
*F21Y 101/02* (2006.01)

(52) U.S. Cl.
CPC ............ *F21L 14/00* (2013.01); *H05B 37/0272* (2013.01); *F21V 14/045* (2013.01); *F21V 23/0435* (2013.01); *H05B 33/0842* (2013.01); *F21Y 2101/02* (2013.01); *Y10S 362/802* (2013.01)
USPC .......................... 362/276; 362/802; 362/103

(58) Field of Classification Search
USPC ................................. 362/802, 276, 295, 103
See application file for complete search history.

(56) References Cited

U.S. PATENT DOCUMENTS

| 5,440,462 | A | 8/1995 | Kim |
| 5,722,762 | A | 3/1998 | Soll |
| 6,290,368 | B1 | 9/2001 | Lehrer |
| 6,443,604 | B1 * | 9/2002 | Rudenberg ................ 362/488 |
| 6,461,024 | B1 | 10/2002 | Becker |
| 6,465,962 | B1 * | 10/2002 | Fu et al. ........................ 315/77 |
| 6,955,444 | B2 | 10/2005 | Gupta |
| 7,321,301 | B2 * | 1/2008 | Spoltore et al. .......... 340/539.22 |
| 7,604,378 | B2 * | 10/2009 | Wolf et al. .................... 362/253 |
| 2004/0240208 | A1 * | 12/2004 | Beasley ........................ 362/276 |
| 2004/0264175 | A1 | 12/2004 | Willoughly |
| 2004/0264176 | A1 * | 12/2004 | Vanderschuit ............... 362/106 |
| 2005/0099824 | A1 | 5/2005 | Dowling et al. |

* cited by examiner

*Primary Examiner* — Laura Tso
(74) *Attorney, Agent, or Firm* — Law Office of Carl Giordano, PC

(57) ABSTRACT

A remote control operation of an illuminated unit attached to a headset consisting of a headband and at least one optical device providing illumination at a known distance from the optical device attached to the headband is disclosed. The remote control unit incorporates a sensing unit that causes power to be switched on and off by the detection of motion in front of the sensing unit. In addition, the illumination may be increased or decreased based on a signal strength of a detected remote sensing signal.

19 Claims, 25 Drawing Sheets

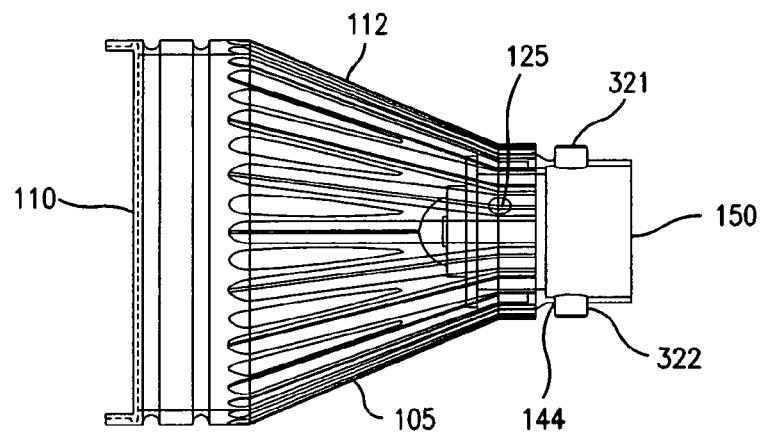
FIG. 9A
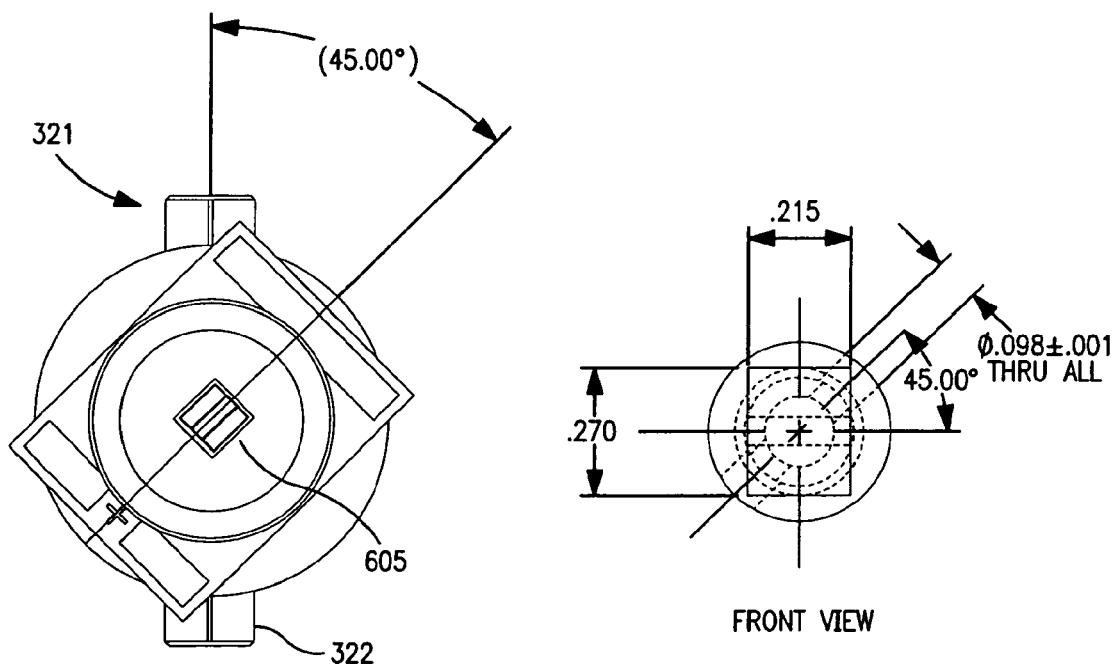
FIG. 9B
FRONT VIEW
FIG. 9C

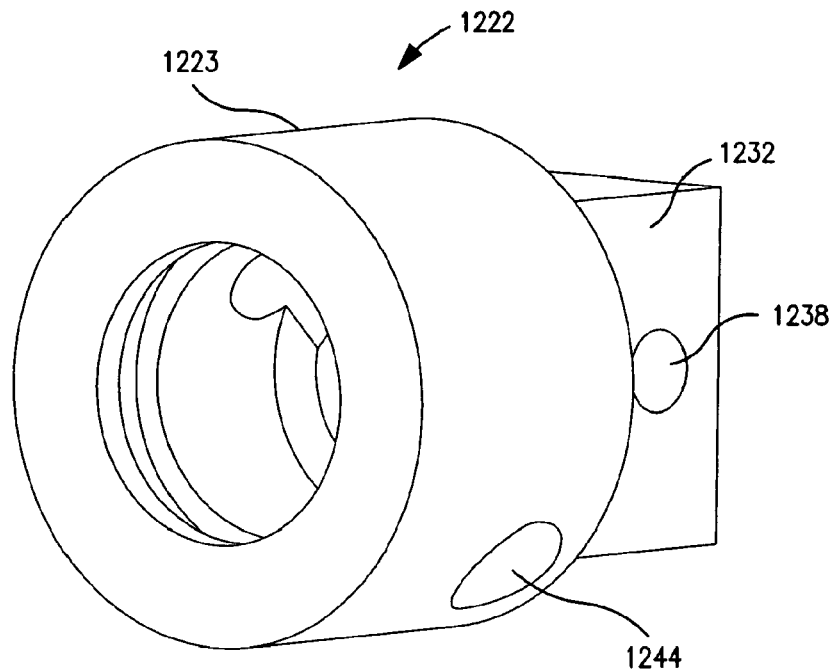
FIG. 10B
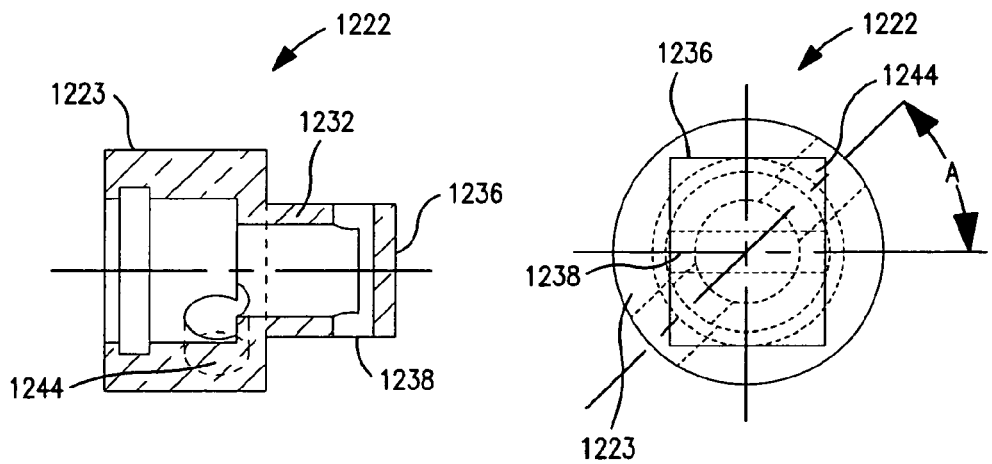
FIG. 10C  FIG. 10D

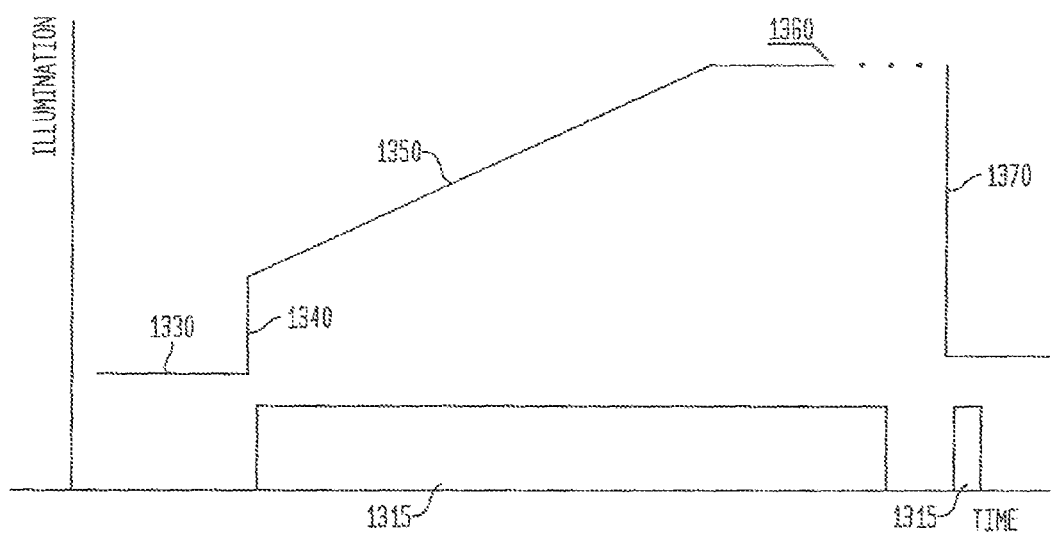

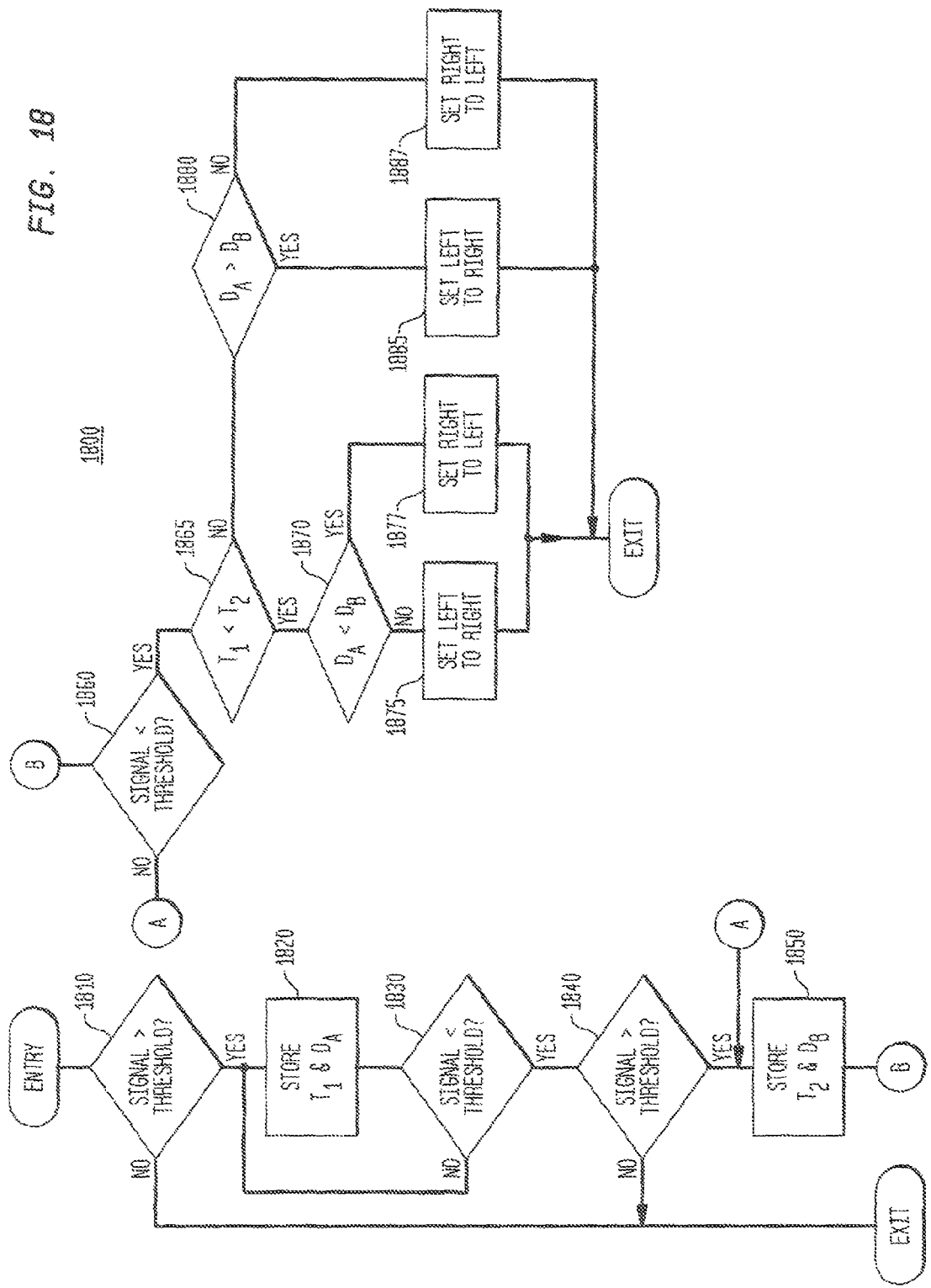

REMOTE CONTROL OF ILLUMINATING HEADLAMP

CLAIM OF PRIORITY

This application claims, pursuant to 35 USC §120, priority to, and the benefit of the earlier filing date, as a Continuation-in-Part, of that patent application entitled "Illuminating Headlamp Providing Substantially Uniform Illumination," filed on Feb. 1, 2010 and afforded Ser. No. 12/658,025, now U.S. Pat. No. 8,215,791, which is a continuation of, and claims priority to, that patent application, entitled "Illuminating Headlamp Providing Substantially Uniform Illumination," filed on Mar. 3, 2008 and afforded Ser. No. 12/074,370, now U.S. Pat. No. 7,690,806, which claimed the benefit of the earlier filing date, pursuant to 35 USC §119(e), to that patent application entitled "Illuminating Headlamp and Method of Illumination," filed on Mar. 30, 2007, and afforded Ser. No. 60/921,150, the contents of each of which are hereby incorporated by reference herein.

In addition, this application is further related to that patent application entitled "Illumination Assembly," filed on Oct. 18, 2007 and afforded Ser. No. 11/975,194, now U.S. Pat. No. 7,883,233, the contents of which is hereby incorporated by reference herein.

FIELD OF THE INVENTION

This application is related to the field of illumination devices, and more particularly to a system for remotely controlling illumination devices used for precisely directing light to a desired area.

BACKGROUND

Illumination devices are employed in a wide variety of contexts. Various types of fine work require high intensity illumination over a small area at a relatively short distance from the eyes of a user. Examples of such fine work include surgery, dentistry and watch and jewelry repair. Illuminating headsets are suited for these types of work as they allow a light to be projected at an area while leaving the hands free to manipulate tools or surgical equipment.

Prior art headsets typically have a remote source of illumination connected by a fiber optic cable to the headset. The remote source of illumination is typically a bulb, which may be, for example, a metal halide or a xenon bulb. A suitable lens is provided to couple the bulb output to a fiber optic cable, in the headset. While the fiber optical cable attached to the headset is cumbersome and may be inconvenient to the user, the power requirements and heat output of metal halide and xenon bulbs make it impractical for these illumination sources to be mounted on the headset.

In the prior art, the use of light-emitting diodes as a light source has been suggested. U.S. Pat. No. 6,955,444, to Gupta, discloses the use of a headlamp with two LEDs. Each LED is mounted relative to a reflector to provide sufficient illumination on a target region. However, reflectors typically provide a diffuse illuminated region. The use of two LEDs also adds weight, cost and complexity to the device.

US Published Patent Application serial no. 2005/0099824, to Dowling, also discloses the general concept of integrating an LED into a headlamp. However, this patent application provides little detail as to implementation. Another example in the prior art is the Zeon® LED Portable High-Definition Light, available from Orascoptic, 3225 Deming Way, Suite 190, Middleton, Wis. 53562. This device incorporates a LED mounted in front of reflectors. A collimator captures the light from the LED. The use of the collimator captures a maximum percentage of the light emitted by the LED. However, illumination is not uniform over the target area. Rather the intensity of illumination peaks at the center and then gradually decreases with distance from the center of the illuminated area.

However, in the field of medical illumination devices when a doctor, surgeon or dentist, for example, utilizes a headlamp as described herein, the doctor, surgeon or dentist (i.e., a user) is in a sterilized state and cannot easily adjust the intensity of light. That is, once the illumination device is turned-on and the user (i.e., doctor, surgeon or dentist) is in a sterile state, the user is no longer able to control the intensity of the illumination from the illumination device, without having to re-sterilize himself or herself.

Thus, the user must turn-on the device before the sterilization procedure is begun and must leave the illumination on during an entire time, unless the user wishes to initiate the sterilization procedure again. In addition, leaving the light turned-on at a full intensity decreases the amount of time that the illumination device may provide the desired illumination as these illumination devices are typically operated on a battery power.

Hence, there is a need in the industry for a method and system for remotely controlling the operation of an illumination device that avoids the need to require re-sterilization when the illumination device is turned on/off. In addition, a method and system for adjusting the intensity of the illumination without requiring re- sterilization would be advantageous.

SUMMARY THE INVENTION

In one aspect of the invention, an apparatus for remotely controlling an illumination unit is disclosed. The apparatus comprises, a battery unit electrically connected to said illumination unit, at least one transmitting unit, a receiving unit in communication with the battery unit, the receiving unit detecting a signal generated by the at least one transmitting unit, generating a battery control signal in response to the detected signal generated by the at least one transmitting unit; and providing the battery control signal to the battery unit, wherein the battery unit alters a voltage (or current) provided to the illumination unit in response to the battery control signal.

In an aspect of the invention, there is discloses an apparatus for remotely controlling an illumination unit attached to a headset, the apparatus comprising a transmitting unit transmitting an RF signal, a receiving unit receiving said RF signal, determining whether a strength of said RF signal exceeds a predetermined threshold value and generating a control signal when the strength of the RF signal exceeds the predetermined threshold value and a battery unit receiving the control signal and altering a voltage (or current) applied to said illumination unit to change said illumination unit from one state to another state in response to the control signal.

BRIEF DESCRIPTIONS OF THE FIGURES

The advantages, nature, and various additional features of the invention will appear more fully upon consideration of the illustrative embodiments to be described in detail in connection with the accompanying drawings wherein like reference numerals are used to identify like element throughout the drawings:

FIGS. 9A-9C illustrate views of the relationship of the light-emitting array in the mounting shown in FIG. 8;

FIGS. 10A-10D illustrate views of an alternate emitter for use in the assembly shown in FIG. 2 in accordance with the principles of the invention;

FIGS. 13A-13C represent graphs of illumination in response to the remote control operations shown in FIGS. 11A-11C;

FIG. 18 illustrates an exemplary process in accordance with the embodiment of the invention shown in FIG. 11D.

DETAILED DESCRIPTION

It is to be understood that the figures and descriptions of the present invention described herein have been simplified to illustrate the elements that are relevant for a clear understanding of the present invention, while eliminating, for purposes of clarity many other elements found in illuminating headsets. However, because these elements are well-known in the art, and because they do not facilitate a better understanding of the present invention, a discussion of such element is not provided herein. The disclosure herein is directed to also variations and modifications known to those skilled in the art.

Figure 1:
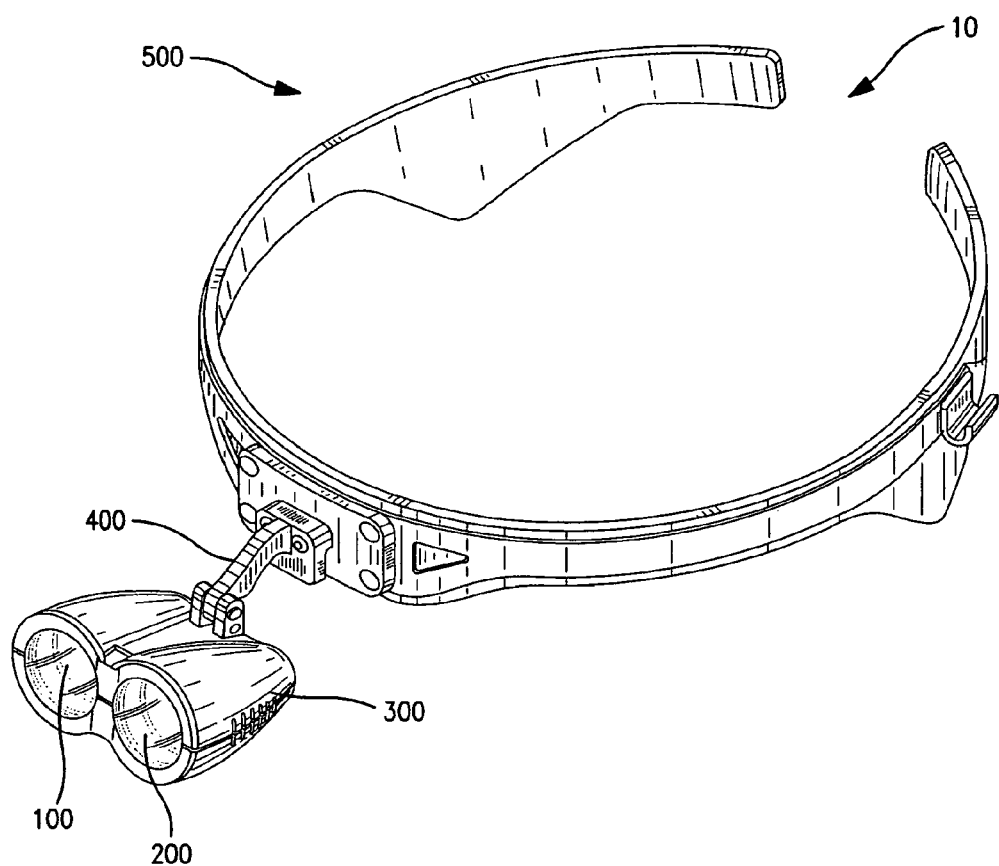
FIG. 1 represents a perspective view of an illuminating headset.

FIG. 1 represents an illuminating headset assembly. Headband assembly 10 includes generally two light-emitting units, or illumination devices, 100, 200, within housing 300, which is attached to assembly 10 by bar 400. Illumination devices 100, 200 are supported relative to one another with housing 300, which is attached to assembly 10 by bar 400. Illumination devices 100, 200 are adapted to emit light in relatively narrow beams that intersect and entirely or substantially overlap at a selected distance from the illumination devices. Headband 500 supports housing 300 including illumination devices 100, 200.

Although headband assembly 10 is shown to include two light-emitting devices, it would be appreciated that assembly 10 may also be constructed to include only a single light-emitting device. As the principles of operation of the light-emitting devices 100, 200 are generally identical; a description of only one of the devices will be described in detail herein.

Figure 2A:
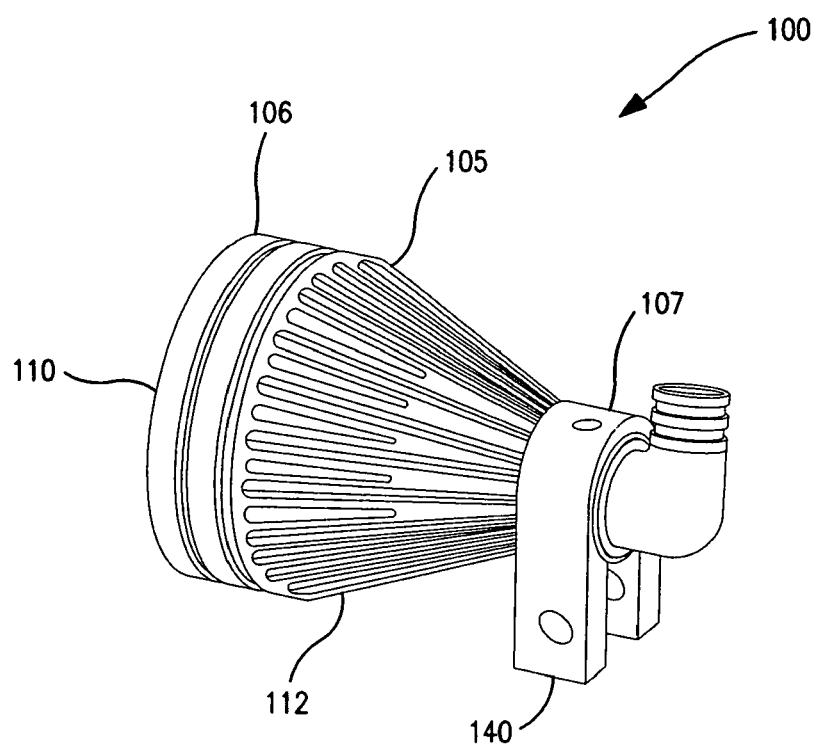
FIG. 2A represents an isometric drawing of an exemplary LED holding device in accordance with the principles of the invention.
Figure 2B:
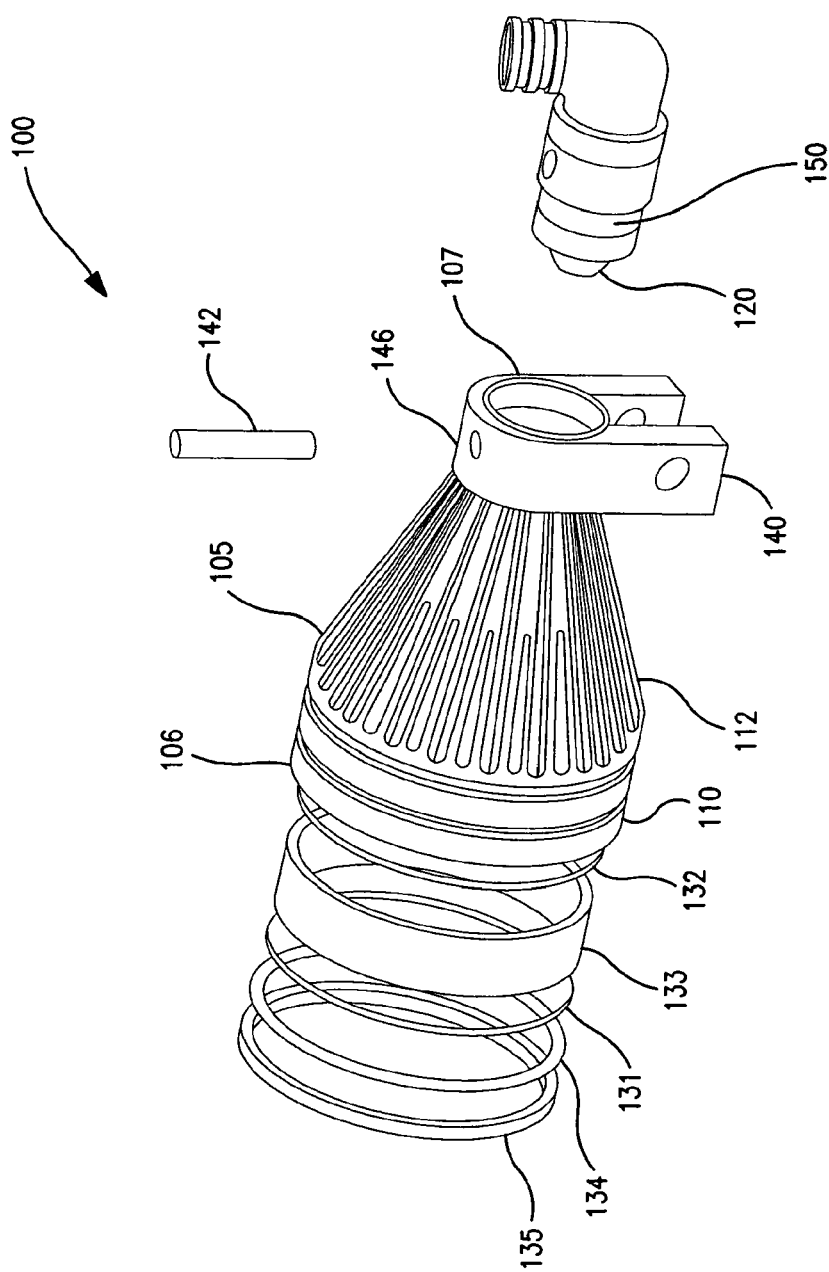
FIG. 2B represents an exploded view of the device shown in FIG. 2A.

FIG. 2A represents a single one of the light-emitting devices 100, 200 of an illuminated headset in accordance with the principles of the invention. FIG. 2B represents an exploded view of the device 100 (or 200) shown in FIG. 2A.

Referring to FIG. 2A, device 100 is an illuminating device having an opaque housing 105 having a distal end 106 and a proximal end 107, an opening 110 at the distal end 106 and a tapering portion 112 intermediate the distal end 106 and the proximal end 107. Referring to FIG. 2B, a light emitting diode 120 is mounted within a mounting 150 that is positioned in housing 105 near the proximal end 107. The light emitting diode is positioned to emit light toward opening 110. Lenses 131, 132 are positioned in housing 105 distally from the light emitting diode 120 to receive and retransmit through opening 110 a portion of the emitted light. Lenses 131, 132 allow the focusing or defocusing of light emitted from light emitting diode 120. Lenses 131, 132 may be adjusted to provide a zone of substantially uniform illumination at a known distance from the distal end of device 100.

Referring to FIG. 2B, lenses 131, 132 may be held in place by sleeve 133, O-ring 134 and closing-ring 135. Lenses 131, 132 may be spherical or aspherical and may be of a glass composition with or without a plastic coating. Epoxy may be employed to fix lenses 131, 132 to sleeve 133. Although only two lenses are illustrated, it would be recognized that the number and selection of lenses may be varied without altering the scope of the invention.

Mounting bracket 140 is attached to housing 105 near the proximal end of assembly 100. Mounting bracket 140 is an example of a bracket adapted to be attached to a headband 500 (FIG. 1) so that device 100 may be mounted on the head of a user. Mounting bracket 140 is shown having a body with an opening therethrough to receive the proximal end 107 of housing 105.

Mounting pin 142 may be inserted into bore 146 and into corresponding bores in housing 110 and a bore 144 in LED mount 150 to secure housing 105, mounting bracket 140 and LED mount 150 relative to one another.

LED mount 150 may be in physical contact with housing 105 or otherwise configured to provide good heat conduction from mount 150 to housing 105. LED mount 150 may be selected from a material that is a good heat conductor. For example, mount 150 may be a copper or a tellurium copper alloy. Housing 105 may be made of a similarly good heat conductor, e.g., copper or aluminum. In one aspect, an uneven outer surface of housing 105 may be provided, as illustrated. Such uneven surface may be represented as grooves defined in the outer surface of housing 105. The uneven surface increases the surface area and, hence, the spread the heat over a greater surface area. In any event, the surface can also be smooth.

Although device 100 shown in FIGS. 2A and 2B is shown having a conical shape, it would be recognized by those skilled in the art that this illustrates a preferred embodiment of the invention and that other shapes, e.g., cylindrical, are currently contemplated and considered to be within the scope of the invention.

Figure 3A:
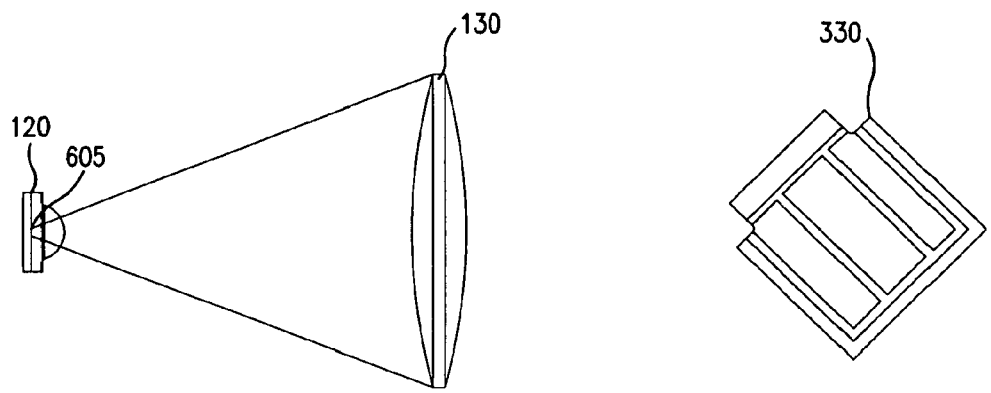
FIGS. 3A-3C represent simplified exemplary ray diagrams associated with the device shown in FIG. 1.
Figure 3B:
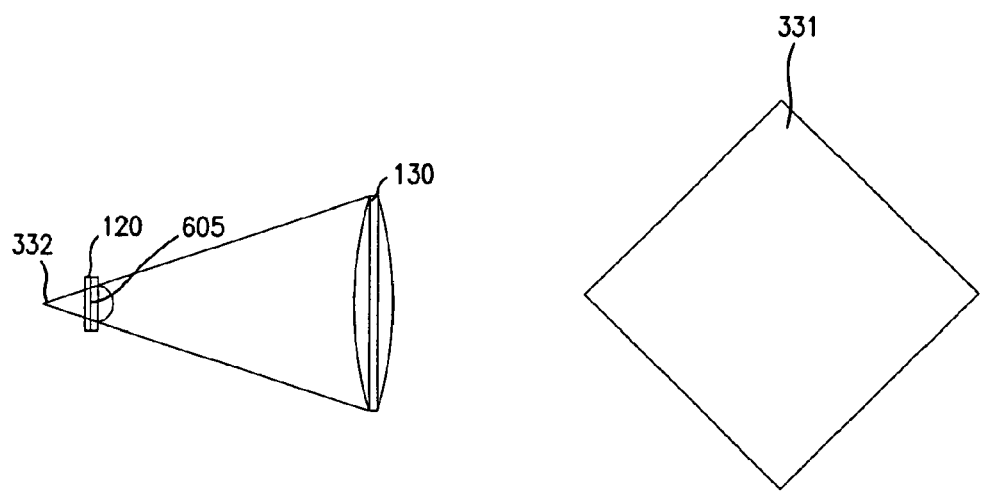
Figure 3C:
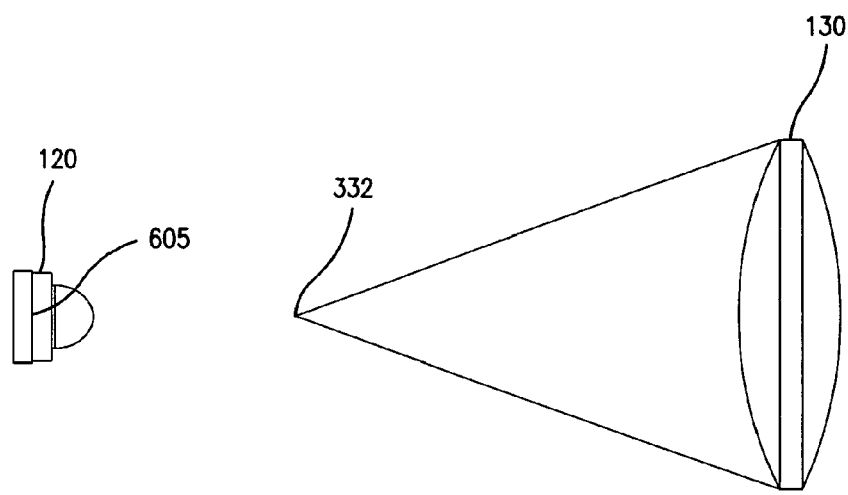

FIGS. 3A-3C represent simplified exemplary ray diagrams associated with the device shown in FIGS. 2A and 2B. It will be appreciated that lenses associated with lens 130 are merely schematic and may include a plurality of lenses and/or reflectors. Emitter 120 represents a plurality of light emitting diodes arranged in an array 605. Array 605 may have a pattern as shown in, and described in further detail with regard to a discussion of, FIG. 4.

Referring to FIG. 3A, lens 130 is positioned relative to array 605 with its focal point on array 605 so as to project a focused image of array 605 on an incident or target area 330. Because of the placement of array 605 at the focal point of lens 130, details of the array may be seen within the target image. This focused image is undesirable as it fails to provide a substantially uniform illumination within the target area.

Figure 6A:
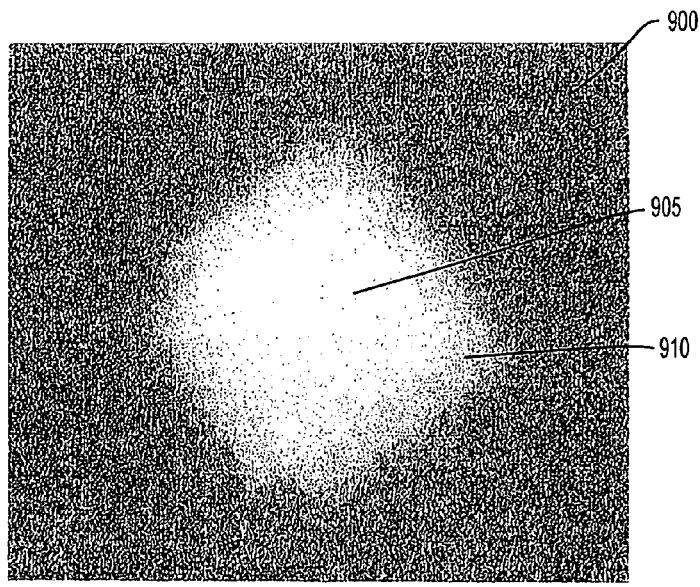
FIGS. 6A and 6B represent exemplary illuminated areas associated with focus-ed and defocus-ed operation of the device shown in FIG. 1.
Figure 6B:
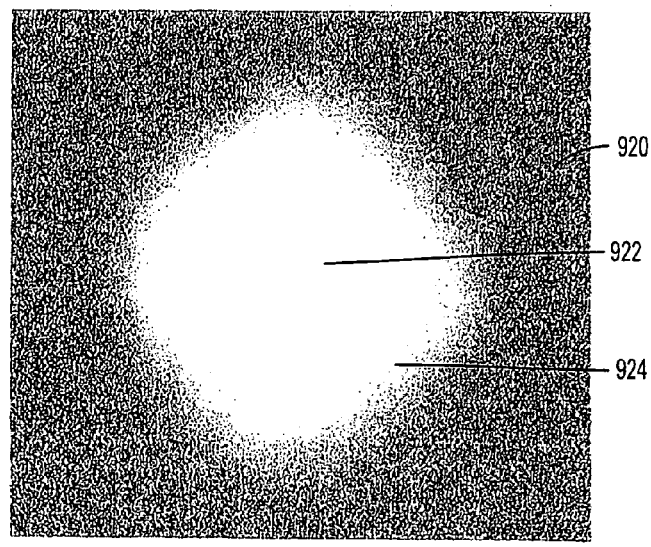

Referring to FIG. 3B, lens 130 is configured so that its focal point, identified as 332, is behind array 605. In this case, the defocusing of the light generated by array 605 causes a defocused image 331 to be projected on a target area at the same distance as shown in FIG. 3A. The defocused image provides a distinct zone of substantially uniform illumination without displaying the pattern of array 605. The illuminated area of image 331 is larger than the focused image 330 shown in FIG. 3A and has a higher intensity of illumination. Image 331 has a generally rectangular form, as array 605 is generally rectangular, in this illustrated example. Examples of a focused image of an array and a defocused image of an array projected on a target area are shown in FIG. 6A and 6B, respectively.

FIG. 3C illustrates a configuration wherein the focal point 332 of lens 130 is positioned in front of array 605. This arrangement provides a blurred image of the array with indistinct edges and great variation in intensity. The image provides less uniformity and lower intensity than the defocused image shown in FIG. 3B.

As shown in FIGS. 3A-3C and FIGS. 6A and 6B, a defocused image has a larger area, a more even illumination and a higher intensity of illumination when compared to a focused image of emitter array 605. It will be appreciated that superposition of defocused images of multiple arrays results in both higher illumination intensity and better uniformity of illumination across the illuminated area. In an exemplary embodiment shown, an intensity of about 7,000 foot-candles may be obtained across a field. Devices for providing such intensity are manufactured by Cree with headquarters located in Durham, N.C. The device is sold as the Cree P3 LED: P/N XREWHTL1-0000-07-01 which provides intensity of 7,000 fc at 13" working distance. The intensity is measured with a Gossen Panlux Light Meter P/N 31314095 (Gossen is located in Germany).

Figure 4:
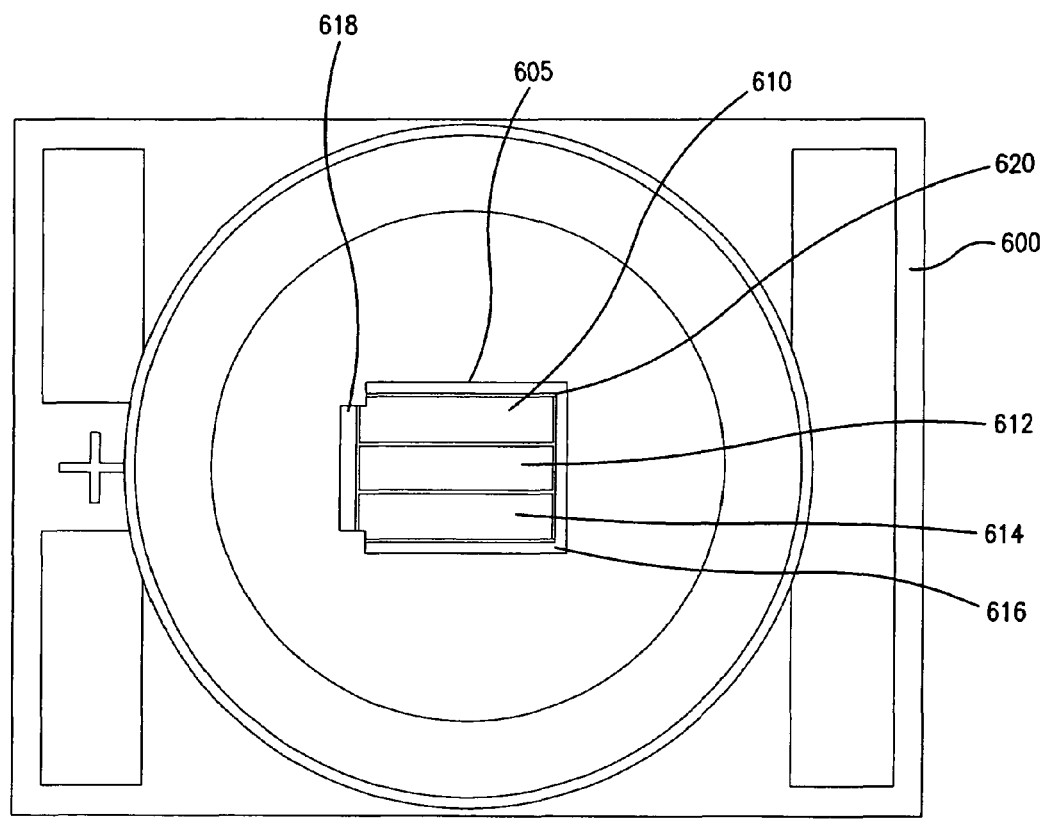
FIG. 4 represents a top view of a LED shown in an array shape suitable for use in the device shown in FIG. 1.

FIG. 4 represents an exemplary LED emitter assembly 600 incorporated into the optical device shown in FIG. 2A. Individual LEDs maybe a Cree XLamp High-Power LED, available from Arrow Electronics, Manalapan, N.J. Array 605 is a two-dimensional array having an overall generally rectangular shape. The array 605 maybe on a single die or on more than one die. Generally rectangular sub-arrays 610, 612, 614 and elongated sub-array 616, 618 emit light. These sub-arrays may include individual diode elements that are relatively closely spaced together. For example, the diodes may be spaces at 400 dots per inch (dpi) or 1200 dpi. Relatively narrow areas 620, which may contain controllers and other devices, for example do not emit light.

As discussed with regard to FIG. 3A, a focused projection of array 605 will result in an image with projections of sub-arrays 610, 612, 614, 616 and 618 being bright with dark lines corresponding to areas 620. Furthermore, variations in light output intensity within sub-array areas may occur. Such variation may occur as a result of errors in manufacturing of the LED sub-arrays. As a result of the pattern of variations in intensity, when a focused image of array 605 is projected onto an incident or target area, noticeable variations in illumination intensity occur (see FIG. 6A).

However, when a defocused image, as discussed with regard to FIG. 3B, is projected onto a target area, variations in illumination intensity are reduced so as to create a zone of substantially uniform illumination as seen in FIG. 6B.

Figure 5:
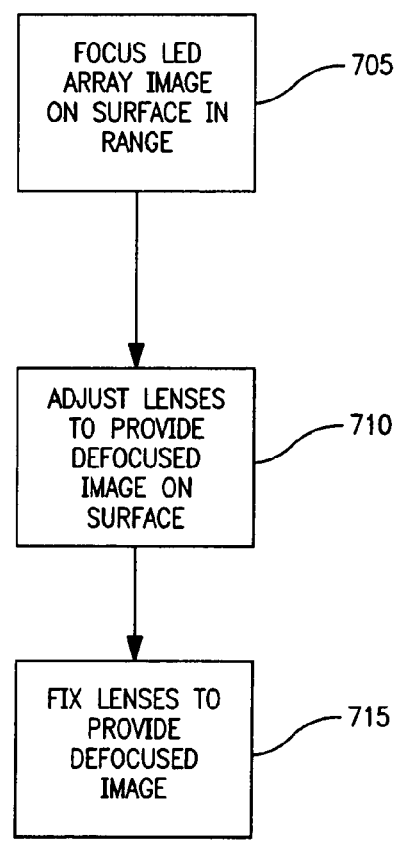
FIG. 5 represents a process flow diagram of a method of operation of the device shown in FIG. 1.

FIG. 5 illustrates a method for providing a zone of substantially uniform illumination utilizing the optical devices as shown in FIG. 2A when incorporated into the illuminated headset shown in FIG. 1. In this exemplary process, an incident plane, such as an opaque sheet, is placed at a desired distance from the illuminated headset 10. The illumination device 100 (200) is activated and an image projected onto the incident plane is placed into focus. The projected image of the emitting array may appear to include at least one distinct illuminated area and may have relatively sharp edges (block 705). The lens or lenses (130, 132) are then adjusted until a defocused image is obtained, as indicated by block 710. Lens adjustment may include changing the distance between the lens 130 (FIG. 2A) and the array 605, changing the distance between lenses 131 and 132, substituting different lenses or adding or removing lenses. As shown in FIG. 313, the adjustment causes the focal point of the lenses to be behind the array 605 (defocused).

In one aspect, a light meter may be positioned at the desired distance and the lenses may be adjusted until the illumination intensity detected by the light meter is substantially at a maximum. With each lens adjustment, the area of illumination at the selected distance may also be checked to determine when the area is a minimum desired size. It will also be appreciated that different LEDs may be selected.

FIG. 6A illustrates the projection 900 of a focused image of array 605 onto a target area at a desired distance from optical device 100. As discussed previously, narrow, non-light emitting regions 910 of array 605 are discernible from the illuminated area 905. In addition, the edges of the illuminated area are less intense than that of the center region.

FIG. 6B illustrates the projection 920 of a defocused image of array 605 onto a target area at a desired distance from optical device 100. As discussed previously, the illumination across the target area is substantially uniform as denoted by the intensity at the center point 922 and edge point 924.

Figure 7A:
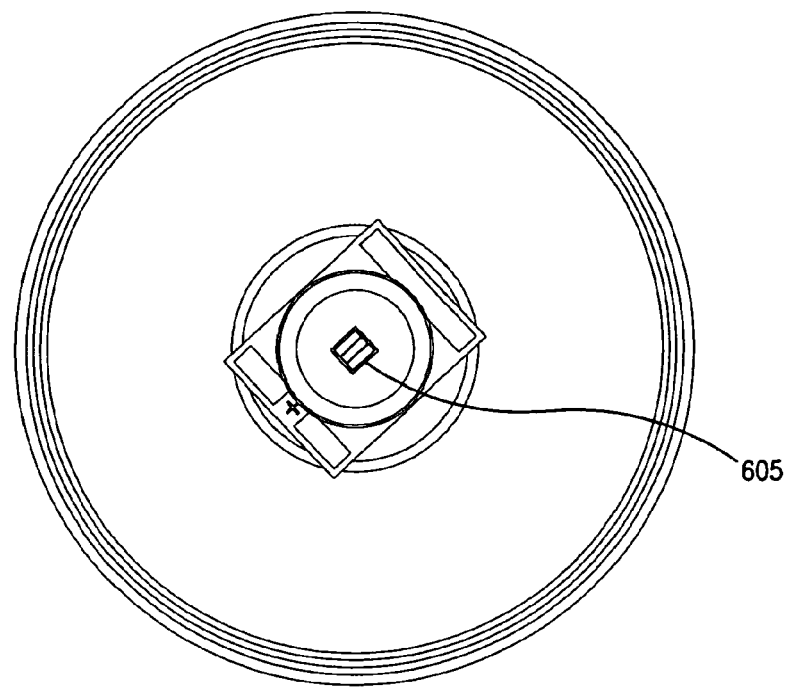
FIGS. 7A and 7B represent exemplary orientation of emitter arrays relative to a single optical device and an assembly as shown in FIG. 1.

FIG. 7A illustrates a front view of the exemplary optical device 100 shown in FIG. 2A. In this exemplary illustration, the orientation of emitter array 605 is preferably selected be to at an angle of substantially 45 degrees to a transverse axis (not shown) of the devices. The angle of 45 degrees is selected to illuminate an area at a selected distance from the assembly to project an image that is substantially square. Otherwise, the projected illumination may have a wider range in one direction (e.g., horizontal) as opposed to another direction (e.g., vertical). If the angle is changed, then other geometric configurations can be accommodated. For example, at an angle of 90 degrees, the configuration would be a square.

Figure 7B:
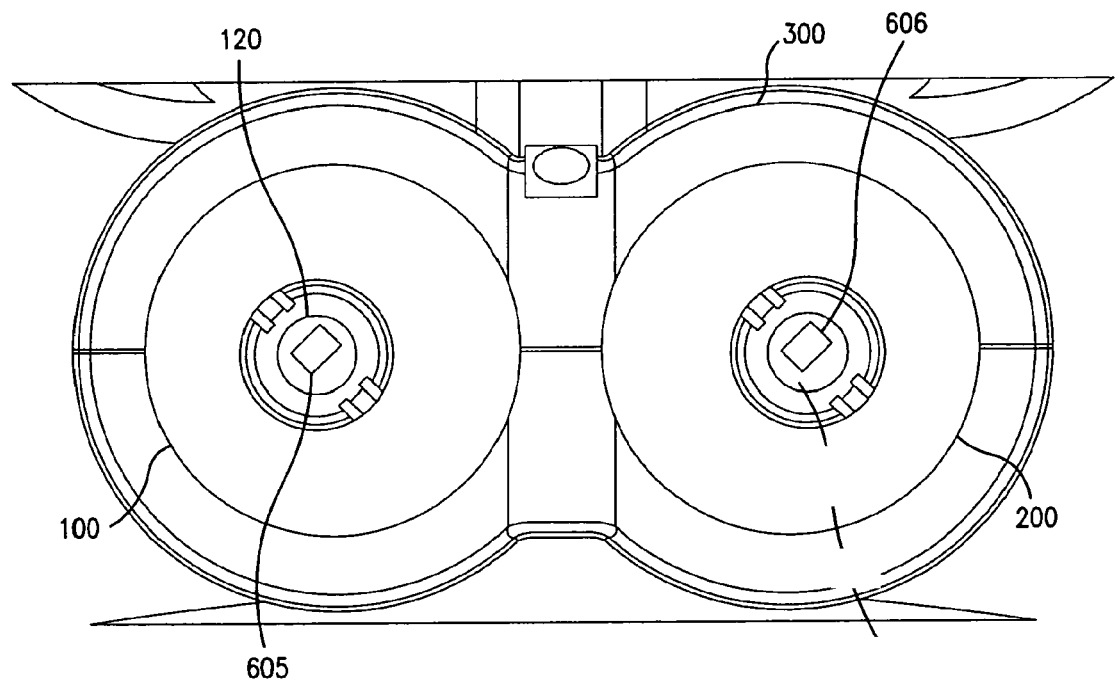

FIG. 7B illustrates a front view of the incorporation of the optical device shown in FIG. 2A in an assembly 300 shown in FIG. 1. In this embodiment, the optical devices 100, 200 are oriented along a horizontal axis of assembly 300. In this illustrated embodiment, the diode arrays 605, 606 are shown having the same orientation to the horizontal axis of assembly 300. The preferred orientation of the array 605 with regard to an axis of assembly 300 is selected for the reasons similar to that discussed above. Although, the arrays 605, 606 are shown in the same orientation, it would be understand that the orientation of the arrays 605, 606 may be independently selected and that other orientations, as well as other emitter array shapes, within the optical device have been contemplated and considered to be within the scope of the invention.

Figure 8:
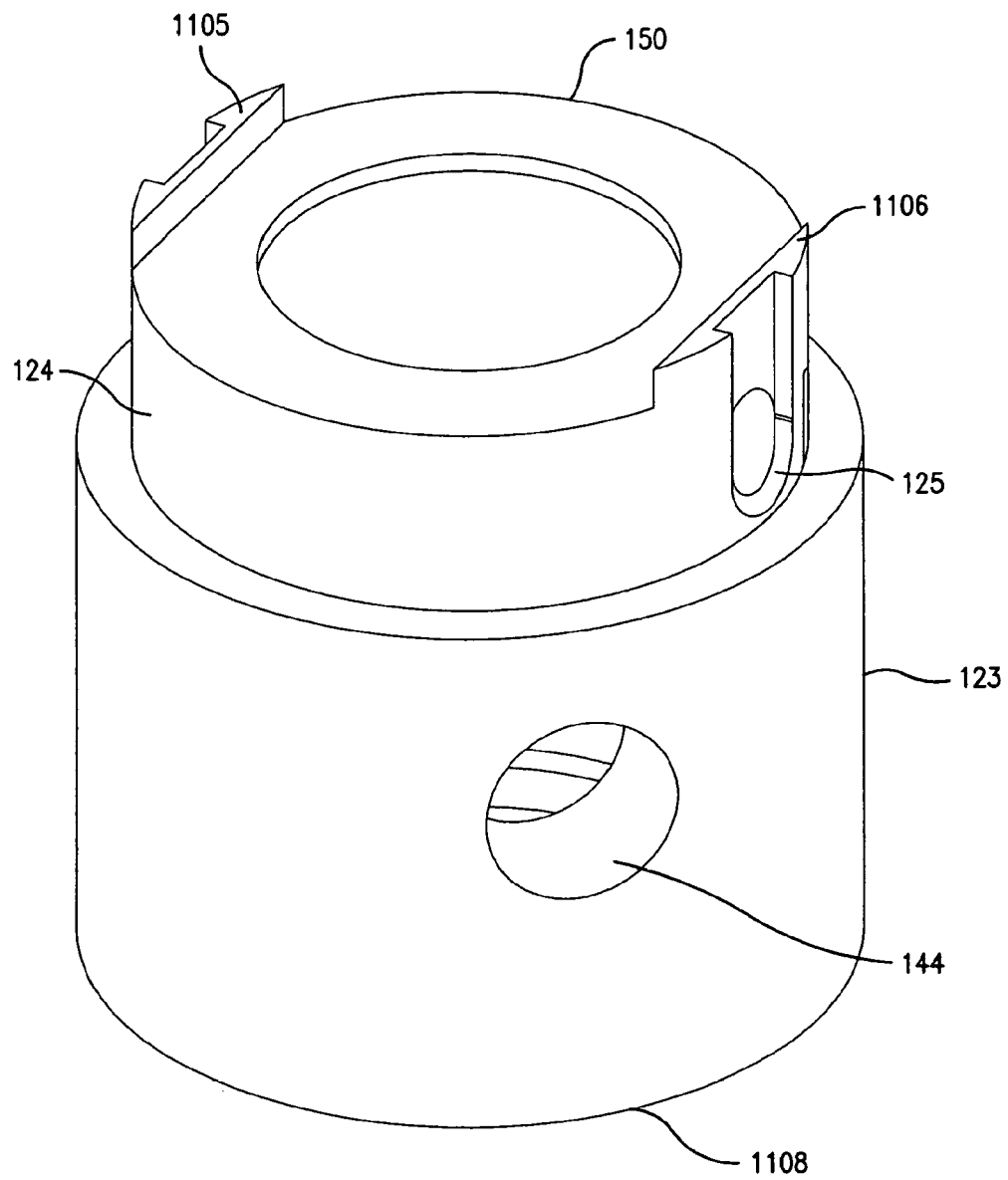
FIG. 8 illustrates an exemplary emitter mount of use in the assembly shown in FIG. 2 in accordance with the principles of invention.
Figure 10A:
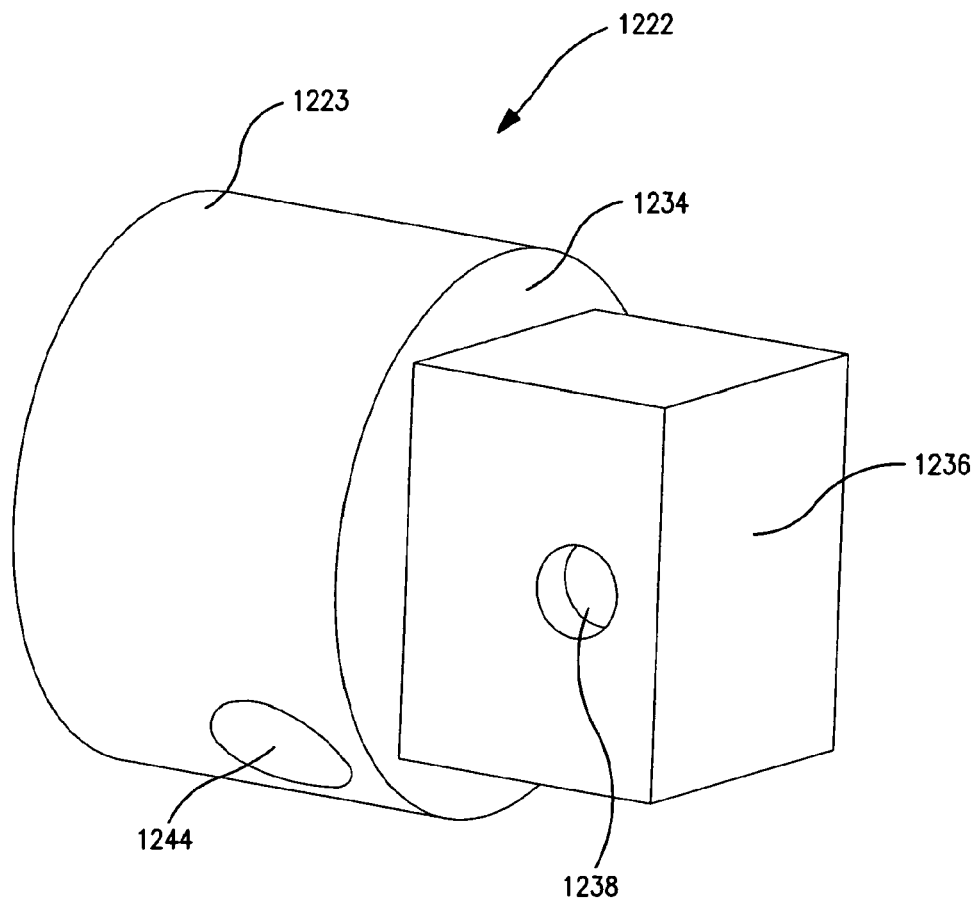

FIG. 8 illustrates an exemplary mount 150 in accordance with the principles of the invention. Mount 150 is preferable selected from materials that act as a good heat conductor, e.g., copper or tellurium copper alloy. Mount 150 is generally a cylindrical hollow body, closed at one end by wall 1108, which provides a platform for emitter array 605, and open at the other end. Major cylindrical wall 123 has a bore 144 through a central axis and a corresponding opposite bore (not shown) along an axis through the central axis of end cylindrical wall 124. End cylindrical wall 124 is coaxial with, and of lesser diameter than major cylindrical wall 123 and the two walls are joined by a shoulder. End wall 1108 has upstanding members 1105, 1106 at opposite sides, positioned to retain a LED array 605 at a selected orientation relative to bore 144. End wall 1108 lies in a plane substantially parallel to the axis of bore 144. Bore 125 provides for wiring that allows connection of array 605 (not shown) to a power source.

Upstanding members 1105, 1106 on surface 1108 are positioned to provide a selected orientation of a LED array (not shown) having a rectangular base and a generally rectangular shape, so that the sides of the LED array are parallel to the sides of the base and that the sides of the array are at an angle substantially 45 degrees relative to the central axis of bore 144 and the bore opposite thereto through major wall 123. As a result of the orientation of pins 321, 322 (FIG. 9A) in bore 144 (and corresponding not shown opposite bore hole) of emitter mount 150, the angle between the axis of bore 144 (and corresponding not shown opposite bore hole) and the sides of array 605 (not shown) when mounted on emitter mount 150, is fixed at a substantially 45 degree angle relative to a horizontal axis.

FIGS. 9A-9C illustrate views of the attachment of mount 150 within the optical device 100 shown in FIG. 2A and an exemplary orientation of the array 605 with regard to the vertical axis of optical device 100. Pins 321, 322 provide means for attaching mount 150 to device 100 and setting the orientation of array 605. FIG. 9A illustrates the insertion of mounting 150 in a distal end of the device 100 and is attachment by pins 321 322. FIG. 9B illustrates a front view of the positioning of array 605 on surface 1108 (FIG. 8) at a preferred angle of substantially 45 degrees to the axis of pins 321, 322. FIG. 9C illustrates a front view of a blueprint representation of the positioning of array 605 on surface 1108. FIG. 9C further illustrates a preferred tolerance for the orientation angle of array 605.

FIGS. 10A-10D illustrate an alternative emitter mounting 1222. Emitter mount 1222, similar to mount 150 (FIG. 8) is a good heat conductor. In this alterative embodiment, emitter mount 1222 is generally in the form of a hollow body, open at one end and closed at the other. Emitter mount 1222 has a major cylindrical wall 1223 at its open end and a bore hole 1244 through outer wall 1223. Bore 1244 may be adapted to receive pins 321, 322 (FIG. 9A). Emitter mount 1222 has a generally rectangular hollow body 1232 defining the closed end of emitter mount 1222. Hollow body 1232 is narrower than major cylindrical wall 1223 and the two are joined by a shoulder 1234. Hollow body 1232 is centered on the axis of major cylindrical wall 1223. A bore hole 1238 through rectangular hollow body 1232 accommodates wiring to an emitter array (not shown) positioned on surface 1236. End wall 1236 is so oriented as to accommodate an emitter at a specified orientation relative to bore hole 1244. In the illustrated example, as may be particularly shown in FIG. 10D, the sides of end wall 1236 are at angle of substantially 45 degrees relative to bore 1244. Similarly, bore 1238 in rectangular body 1232 is at an angle, which in the illustrated embodiment is oriented substantially 45 degrees from bore 1244 in main cylindrical wall 1223.

Figure 11A:
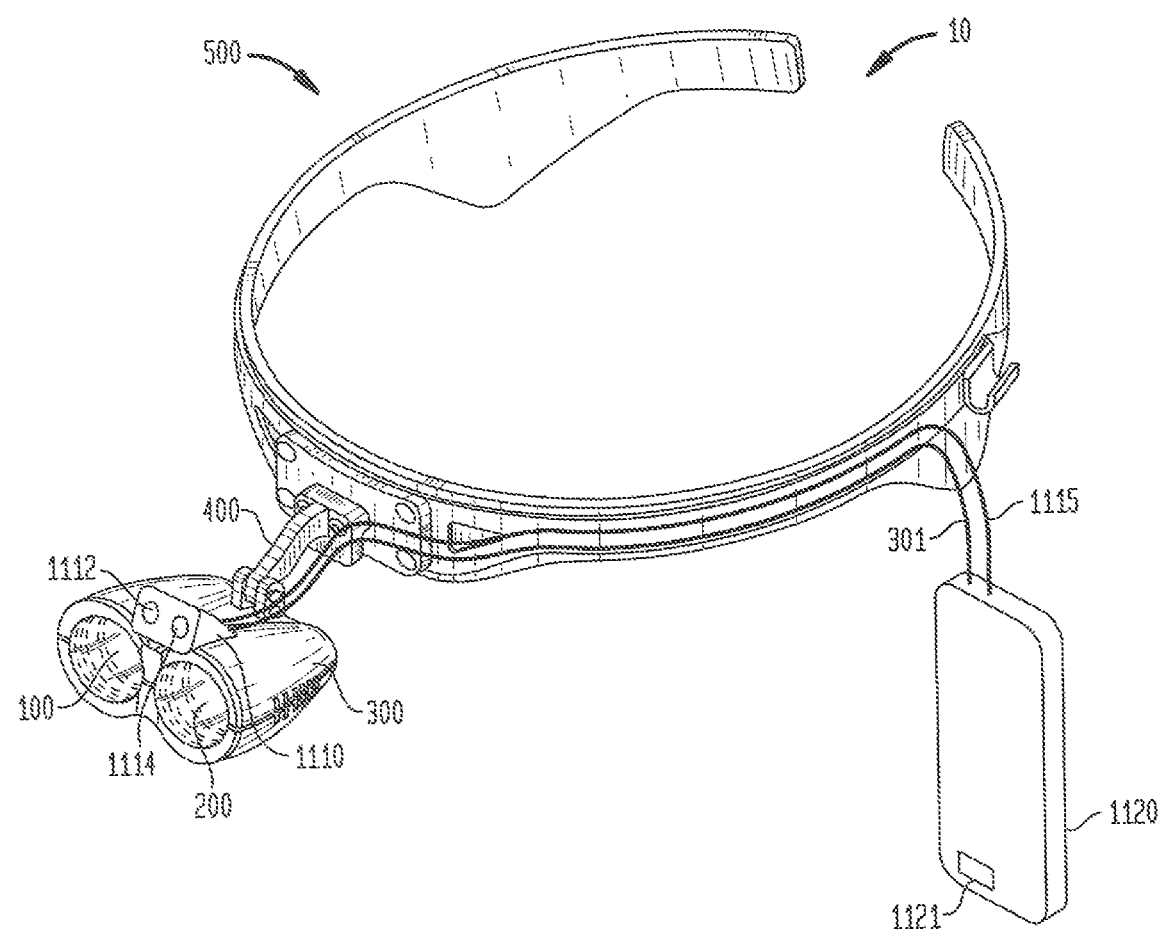
FIGS. 11A-11D represent views of a remote control system in accordance with the principles of the present invention.

FIG. 11A illustrates an exemplary embodiment of a remote control system for controlling the illumination of headband assembly 10, shown in FIG. 1. In this exemplary embodiment, a sensing unit 1110 is placed adjacent to (in this case, atop of) the housing 300 and is electrically connected to a battery pack 1120 through cable 301. Cable 301 provides power (or voltage) from battery pack 1120 to the light emitting diode elements (not shown) contained in housing 300. Similarly, the electrical cable 1115 and the cable 301 between the sensing unit 1110 and the battery pack 1120 are positioned along the headband 500 to retain the electrical and cable lines in a fixed position. The electrical cable 1115 provides control signals from the sensing unit 1110 to the battery pack 1120. In addition, electric cable 1115 may be replaced by a wireless communication link between the sensing unit 1110 and the battery pack 1120, as will be described with regard to an RF communication link between the sensing unit 1110 and the battery pack 1120.

The sensing unit 1110 may be for example be an infra-red sensing unit that detects a change in reflective light (or proximity and ambient light) as an object moves before the sensing unit 1110. For example, the sensing unit 1110 may output a low intensity infra-light beam, through transmitter 1112, which is then reflected back to infra-red detector (or receiver) 1114. The infra-red detector 1114 detects the amount of reflected light within a predetermined distance. When the reflected light exceeds a threshold value, then the detector 1114 may output a pulse signal to indicate that a reflected light exceeds a threshold value. In addition, the pulse signal output may be proportional to a level of intensity of the reflected light. Hence, it may be possible that the amplitude of the pulse signal may increase while the reflected light exceeds the threshold value and a duration of the pulse signal may be determined based on a duration the reflected light exceeds the threshold value.

The battery unit 1120 in receiving a signal (i.e., a battery control signal) from the sensing unit 1110 may operate as a switch to provide power to, or remove power from, the light emitting diodes contained in housing 300. Power is supplied to the light emitting diodes by cable 301, which also is attached to headband 500. Thus, the battery unit may alter the power or voltage output to the light emitting diodes in housing 300 based on the level of the battery control signal.

The battery unit 1120 may also include a switch 1121 that may operate to turn the battery unit on or off. In this case, when the switch 1121 is positioned to retain battery unit 1120 in an OFF condition, signals from the sensing unit 1110 fail to cause the battery unit 1120 to provide power to the light emitting diodes in housing 300. However, when the switch 1121 is in an ON condition, then signals from the sensing unit 1110 cause the battery unit to provide power to, or remove power from, the light emitting diodes in the housing 300.

As would be appreciated, the battery unit 1120 may be positioned on a shirt collar, a shirt pocket, a belt, etc., while the switch control means, i.e., the sensing unit 1110, provides for remote control of the illumination produced by the light emitting diodes in the housing 300. Similarly, the sensing unit 1110 may be included on shirt collar, a shirt pocket, a belt, or attached to the head band 500, as illustrated, without altering the scope of the invention.

Figure 11B:
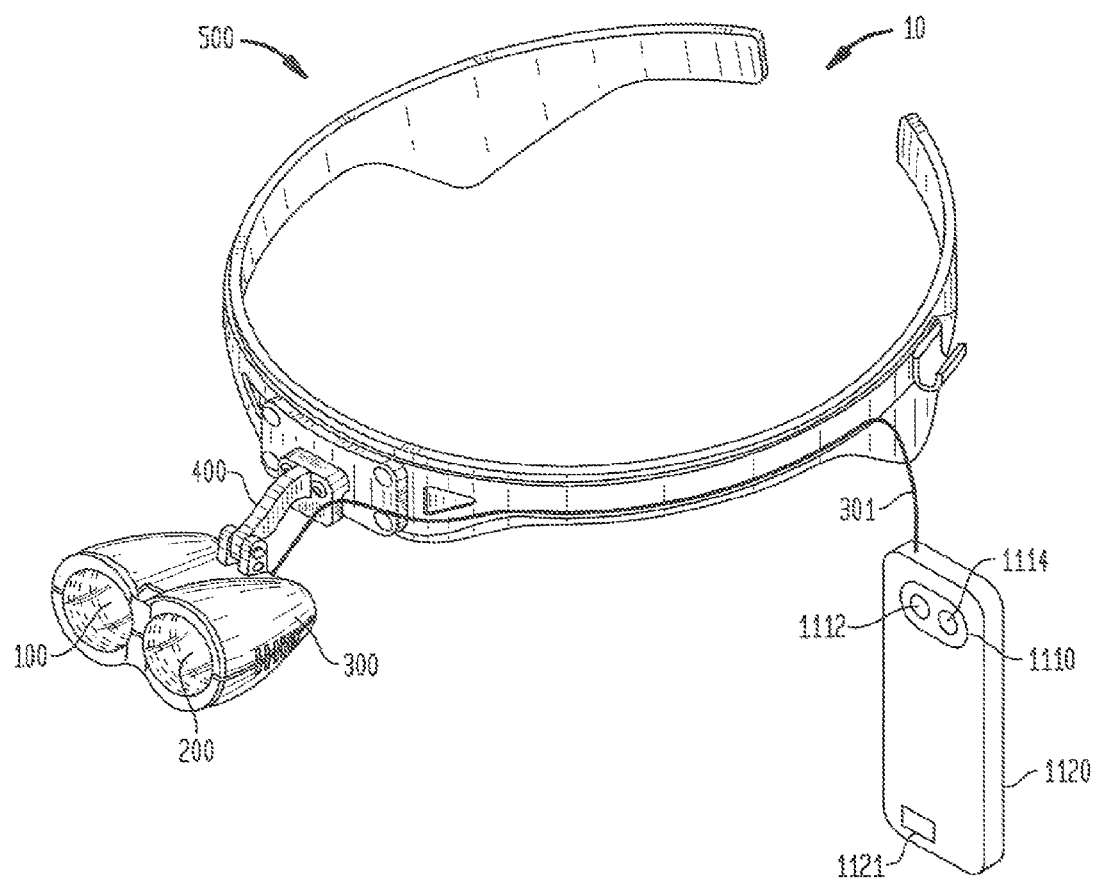

FIG. 11B illustrates another aspect of the invention claimed, wherein the sensing unit 1110 is built into the battery pack unit 1120. In this case, the sensing unit 1110 provides the battery control signal to the battery unit 1120 when a low-intensity infra-red light beam emitted by transmitter 1112 is detected by detector 1114, as previously described.

Figure 11C:
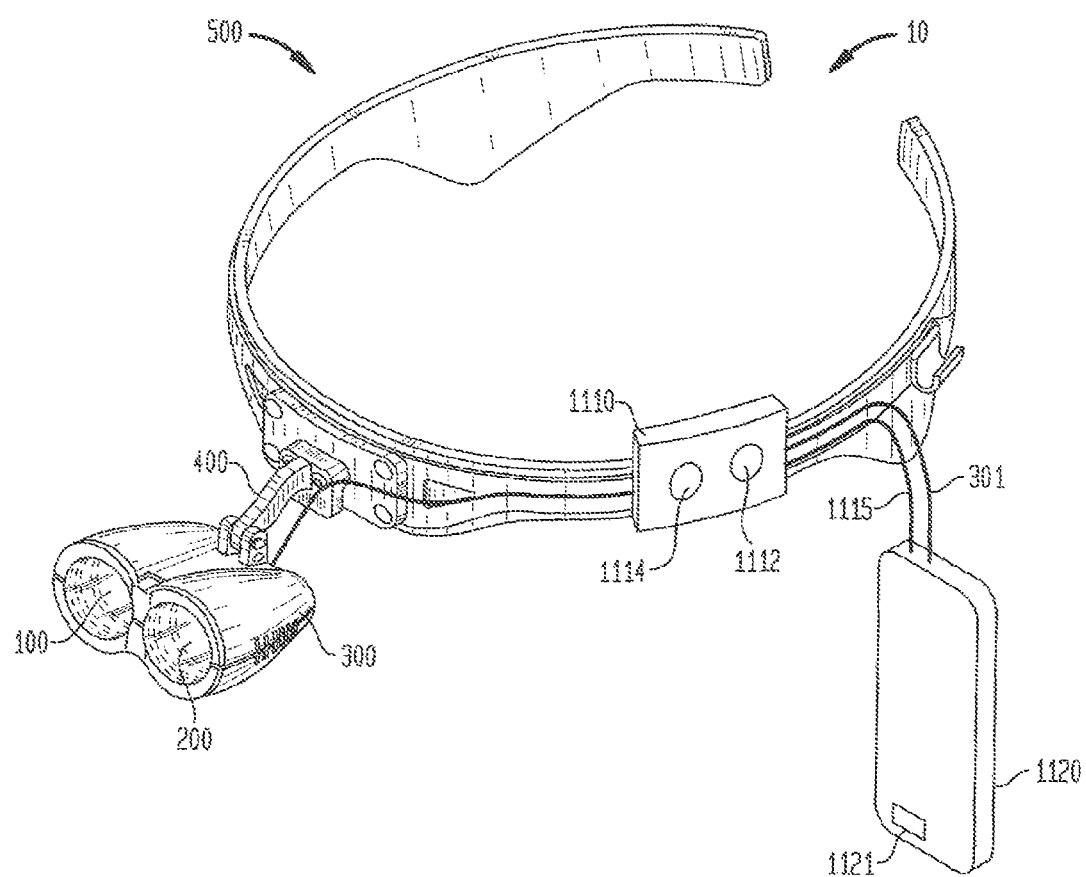

FIG. 11C illustrates still another aspect of the invention claimed, wherein the sensing unit 1110 is positioned along the headband frame 500 of headlamp 100. In this case, the sensing unit 1110 provides a signal to battery unit 1120 when a low-intensity infra-red light beam transmitted by transmitting unit 1112 is detected by infra-detecting (receiving) unit 1114, as previously described. In this case, the illumination of light emitting diodes in housing 300 may be controlled as an object, such as a hand, is positioned in front of sensing unit 1110 or swept past sensing unit 1110.

Figure 11D:
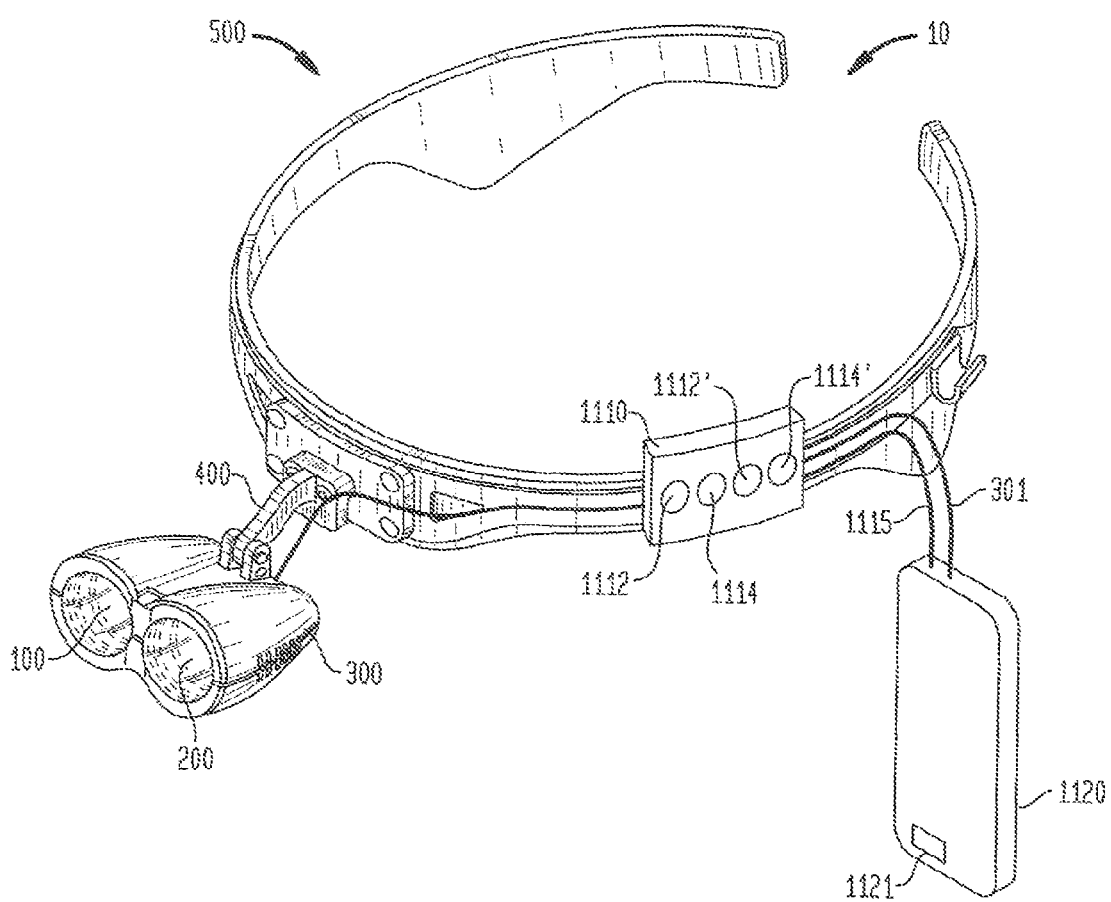

FIG. 11D illustrates another exemplary embodiment of the present invention, wherein at least two sensing devices, each composed of a transmitter 1112 and a detector 1114, are incorporated into a sensing unit 1110, which is positioned along the headband 500 as shown in FIG. 11C. Although the sensing unit 1110 is depicted as including a transmitter 1112 (1112') and corresponding detector 1114 (1114'), it would be appreciated that the sensing unit 1110 may include a plurality of transmitters 1112 (1112') and a single detector 1114. In this case each transmitter may be individually identified so that the detector 1114 may distinguish the return signals from individual transmitters 1112.

In this illustrated embodiment, the at least two sensing devices may determine a direction of motion of an object before sensing unit 1110. For example, when reflected light is detected by a first sensing device and then detected by a second device, the direction of motion may be determined from first to second device. Similarly, when the reflected light is detected by the second device and then detected by the first device, then the direction of motion may be determined in from second to first device. In one exemplary example, when a direction is determined to be from the first device to the second device, an increase in the illumination output of light emitting diodes in housing 300 may occur. Similarly, when the direction is determined to be from the second device to the first device, a decrease in the illumination output of the light emitting diodes in housing 300 may occur.

Although, an increase in illumination is described when the direction is determined to be from a first device to a second device, it would be recognized that an increase in illumination may also be implemented when a direction is determined to be from a second device to a first device and a decrease in illumination may be determined to be from a first device to a second device.

In addition, the amount of illumination may be increased or decreased based on a rate of change of the direction. For example, when a rate of change is slow the illumination may steadily increase as the direction of motion proceeds from a first device to a second device, for example. In this case, the intensity of the signal from the sensing device(s) may be proportional to the amount of reflected light. Thus, as the object proceeds in front of the sensing device(s), the reflected light increases as the object approaches a position perpendicular to a corresponding detecting unit 1114.

Although, the second aspect of the remote operation of the illumination of light emitting diodes in housing 300 is shown with regard to a single implementation (FIG. 11D), it would be recognized that the positioning of the sensing unit 1110 may be positioned as previously described with regard to FIGS. 11A and 11B, without altering the scope of the invention.

In still another aspect of the invention, the illumination of the light emitting diodes within housing 300 may be increased or decreased based upon a distance measure from the sensing unit 1110. For example, a gesture, such as moving away from the sensing unit 1110 decreases the illumination, while moving toward the sensing unit 1110, may cause the illumination to increase. In one exemplary embodiment, when a dentist, for example, utilizes the headlamp 10 shown in FIG. 11A, for example, the illumination may increase as the dentist approaches the patient's mouth while the illumination from the light emitting diodes in housing 300 may decrease as the dentist moves away from the patient's mouth. Thus, there is a savings in battery power as the level of illumination is reduced when not necessary. However, as would be recognized the level of illumination may be set to a minimum value such that a proper level of illumination remains even in this reduced state. In this case, the level of the reflected signal is determined and used to determine a level of the battery control signal that is provided to the battery unit.

Figure 12:
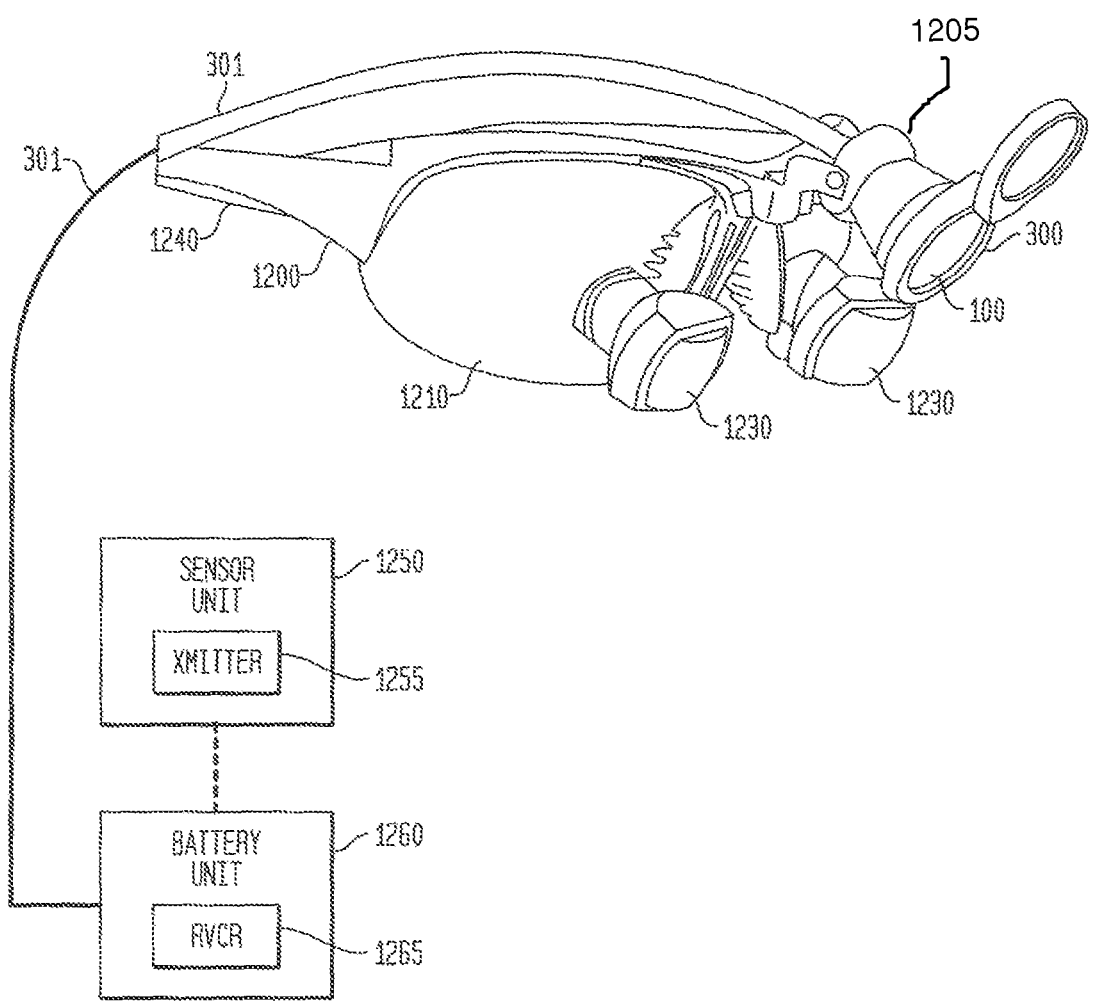
FIG. 12 represents a view of a remote control system in accordance with another aspect of principles of the present invention.

FIG. 12 illustrates another aspect of the present invention, wherein housing 300 includes a single illumination unit 1205 wherein the housing 300 is attached to an eyeglass frame 1200. In this illustrative embodiment, the lens 1210 of eyeglass frame 1200 include magnifying lens 1230. Although not shown, it would be recognized that the illumination unit 1205 is powered by a battery unit similar to that shown in FIG. 11A, for example. Cable 301 provides power from the battery unit (1260) to the illumination unit 100, as previously described. In addition, a sensing unit 1250 (similar to that shown in FIG. 11C) may be positioned along the frame 1240 (similar to that shown in FIG. 11C, 11D) or may be positioned within the battery pack (similar to that shown in FIG. 11B) or may be positioned separately from the frame 1240 and the battery unit 1260, as shown. A sensing unit 1110 (not shown in the instant figure but similar to that shown in FIG. 11C) may be attached to a shirt collar, for example, and may include a transmission unit that may be connected in a wire-ed or a wireless connection to the battery unit to control the application of power from the battery unit 1260 to the illumination unit 100 through cable 301. For example, the sensing unit 1250 may be an RF switch that includes a transmitting unit 1255 that wirelessly connects to a receiving unit 1265 within the battery unit 1260. The receiving unit 1260 in response to a signal transmitted by a transmission unit 1255 within the sensing unit 1250 may then operate to turn-on or turn-off power to the illumination unit 1205.

Figure 13A:
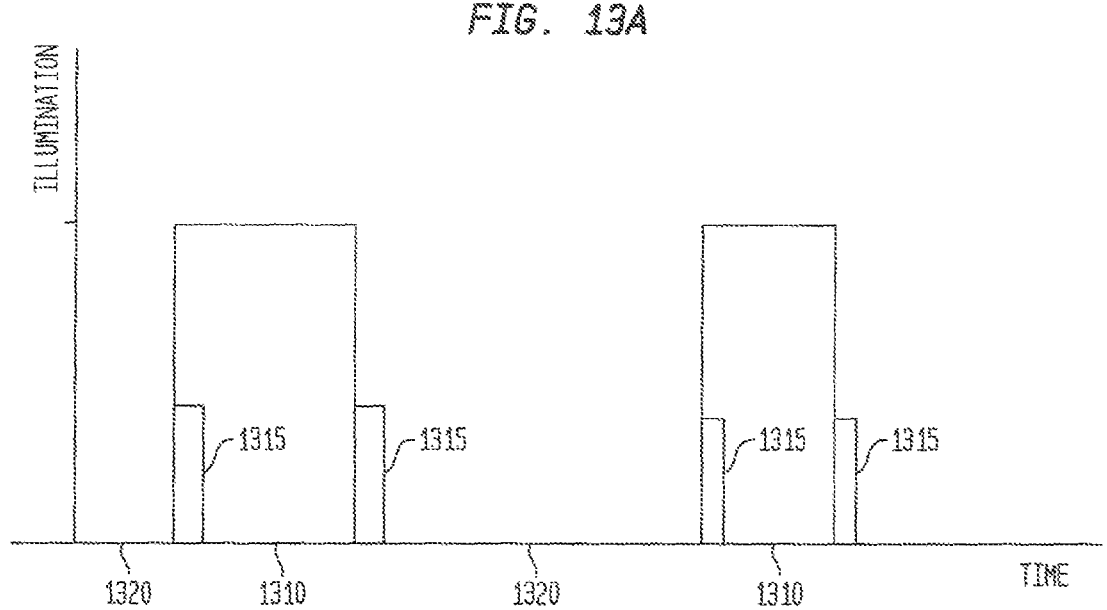
Figure 13B:
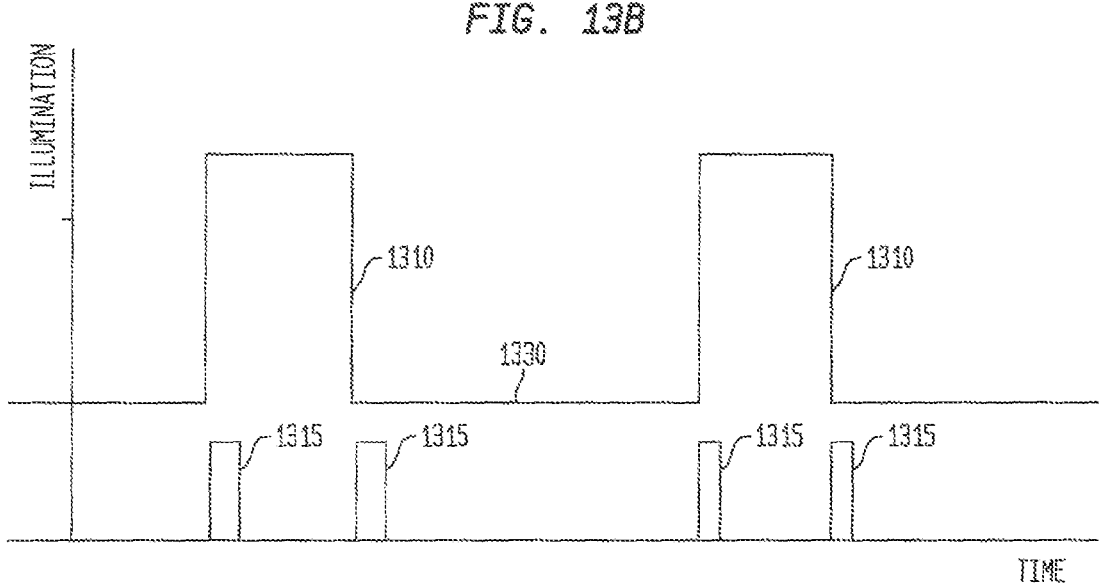

FIGS. 13A-13C illustrate graphs of changes in illumination for the exemplary embodiments of the invention shown herein. FIG. 13A illustrates a level of illumination produced by the light emitting diodes contained in housing 300 when an object appears before sensing unit 1110, which generates pulse 1315. In this exemplary case, the illumination is set to a zero state (1320) and when an object approaches the sensing unit 1110, pulse 1315 is generated to, in this case, toggle (or alter) the power applied to the light emitting diodes in housing 300 from an Off state (1320) to an ON-state (1310). The illumination remains in the ON-state (1310) until a next pulse 1315 is received. With the generation of the next pulse 1315, the illumination is returned to the zero or Off-state (1320). In this case, the remote sensing unit 1110 operates as a toggle switch to turn the illumination from an Off-state 1320 to and On-state (1310) or an On-state (1310) to an Off-State (1320) as the object approaches the sensing unit 1110.

FIG. 13B illustrates a second example of a level of illumination produced by the light emitting diodes contained in housing 300 when an object first appears before sensing unit 1110 and generates a pulse 1315 to cause the illumination level to proceed from a minimum level 1330 to a maximum value 1310. As previously described, when a second or next pulse 1315 is generated by the sensing unit 1110, the illumination level transitions from a maximum level 1310 to a minimum value 1330. In this case, the illumination is set at a minimum level wherein a minimum illumination (1330) may be set when the switch 1121 on the battery pack 1120 is activated.

FIG. 13C illustrates an example, of a change in illumination of the light emitting diodes contained within housing 300 when the object remains in front of sensing unit 1110 for an extended period of time. In this case, a minimum illumination 1330 is achieved when switch 1121 is turned on, as previously described. When an object appears before the sensing unit 1110, pulse 1315 is generated, as previously described. However, in this case, when pulse 1315 is generated, the illumination is increased to a predetermined level (e.g., 50 percent illumination) 1340. As the object remains in front of the sensing unit 1110, pulse 1315 remains active for a time period corresponding to the time the object remains in front of the sensing unit 1110. In this case, the illumination level increases linearly (1350) until a maximum illumination 1360 is achieved. As illustrated, the illumination remains at the maximum 1360 level until a next pulse 1315 is detected. When the next pulse 1315 is detected, the illumination level returns to a minimum level 1330.

Figure 14:
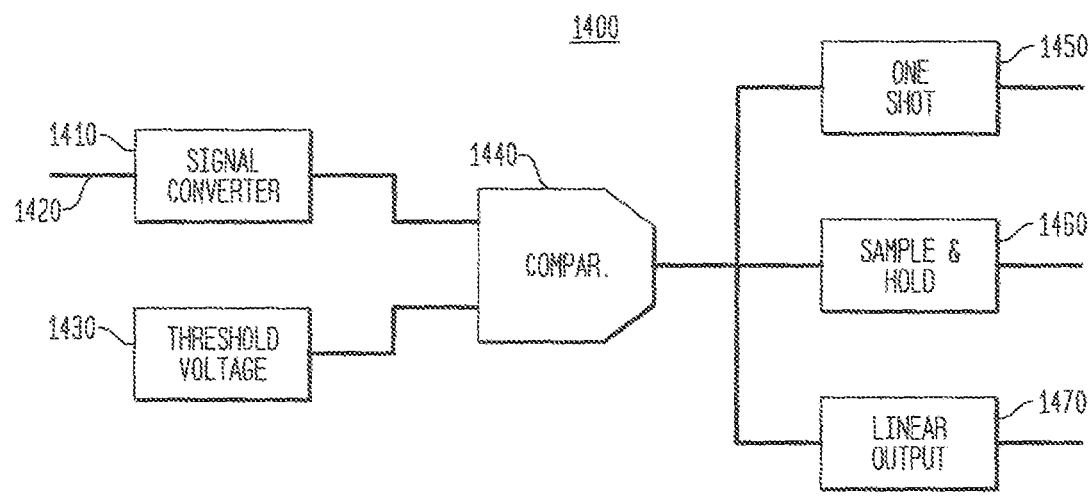
FIGS. 14 illustrates an exemplary circuit for determining detection of reflected infra-red light in accordance with the principles of the invention.

FIG. 14 illustrates an exemplary circuit 1400 for implementing the detecting of a threshold crossing of infra-red light in accordance with the principles of the invention. In this exemplary circuitry 1400 a signal 1420 from an infra-red detector (not shown) is input to a signal converter circuit 1410. The signal converter circuit 1410 may represent a circuit that converts a signal 1420 into a Direct Current (DC) signal. In one aspect of the invention, the signal converter circuit 1410 may include an averaging circuit (not shown) that receives a plurality of pulse signals 1420 and averages the received plurality of pulse signals into a representative DC signal. For example, the averaging circuit may receive a plurality of pulses over a predetermined time period and present an average value of the magnitude of the received pulses as a representative DC value. The output of the signal converter 1410 is provided to a comparator 1440 on a first input of the comparator 1440. A voltage corresponding to a threshold level (1430) is applied to a second input of the comparator circuit 1440. When the input from the threshold circuit is greater than the voltage applied to the second input, then an output is made available from the comparator 1440. The threshold level may be set as one of a plurality of predetermined threshold levels so that the illumination levels may be customized based on a user's requirements.

The output from the comparator 1440 may then be applied to one or more processing circuits, such as One-Shot (e.g., a Schmitt Trigger) 1450, a Sample&Hold (S&H) circuit 1460 or a linear output circuit 1470. When the output of the comparator 1440 is output to the One-shot 1450 then a single pulse is generated (see FIG. 13A, 1315) for a first occurrence of the detection of a voltage above the threshold voltage. This single pulse 1315 may be used to turn-on or turn-off (alter) the illumination of the light emitting diodes contained in housing 300 (FIG. 1) by setting the battery control signal appropriately. Alternatively, if the output of comparator 1440 is applied to the S&H circuit 1460, then the output of the comparator 1440 is sampled continuously (or for a predetermined number of intervals) to produce a single pulse having a time period associated with the length of time the output of the comparator 1440 is above the threshold value. In still another alternative aspect, the output of the comparator 1440 may be applied to a linear output circuit 1470 that produces a voltage output that is proportional to a distance of the object from the detector unit and a duration of time that the object remains before the detecting unit. As would be recognized, the detection of a signal crossing threshold may be determined by polling the status of line 1420 to capture a voltage reading that may be applied to comparator 1440, wherein the polling rate is determined based on a desired response time. Or the detection of a signal crossing threshold may be determined by an interrupt process that generates an interrupt when a threshold crossing is detected.

Figure 15:
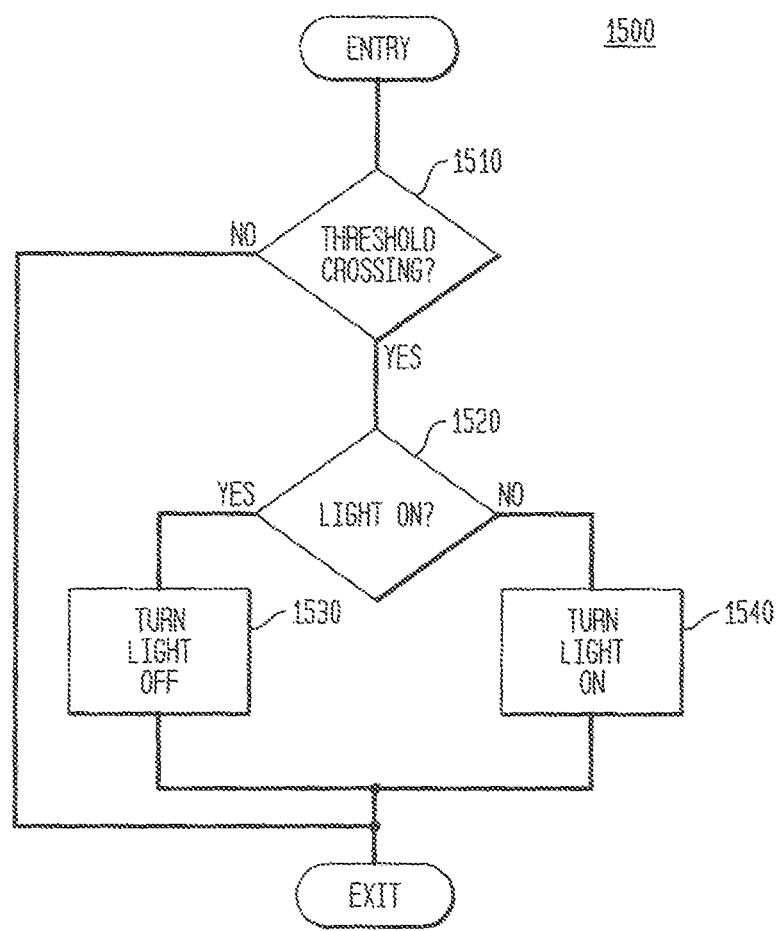
FIGS. 15-17 illustrate exemplary processing in accordance with different aspects of the principles of the present invention.
Figure 16:
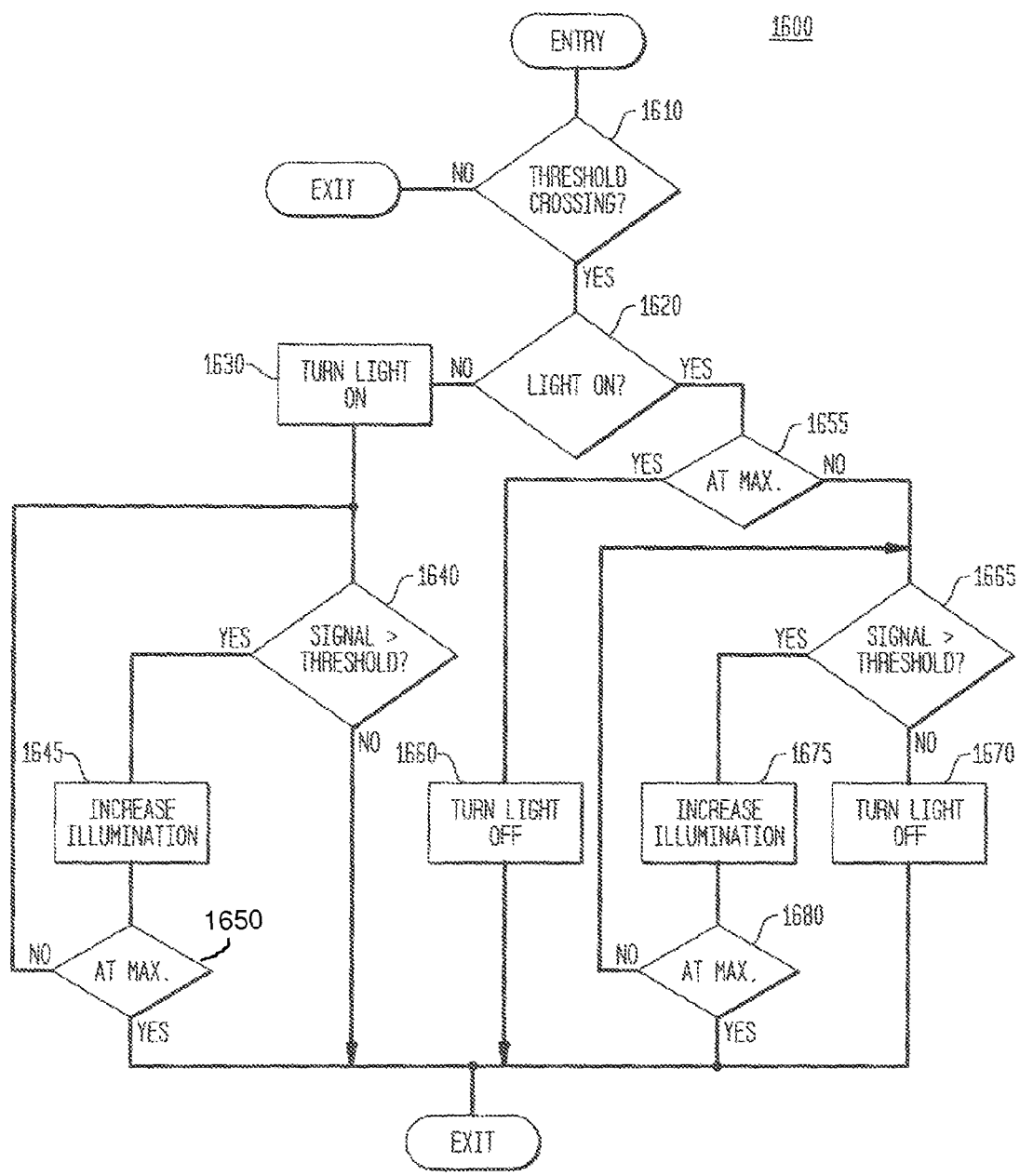
Figure 17:
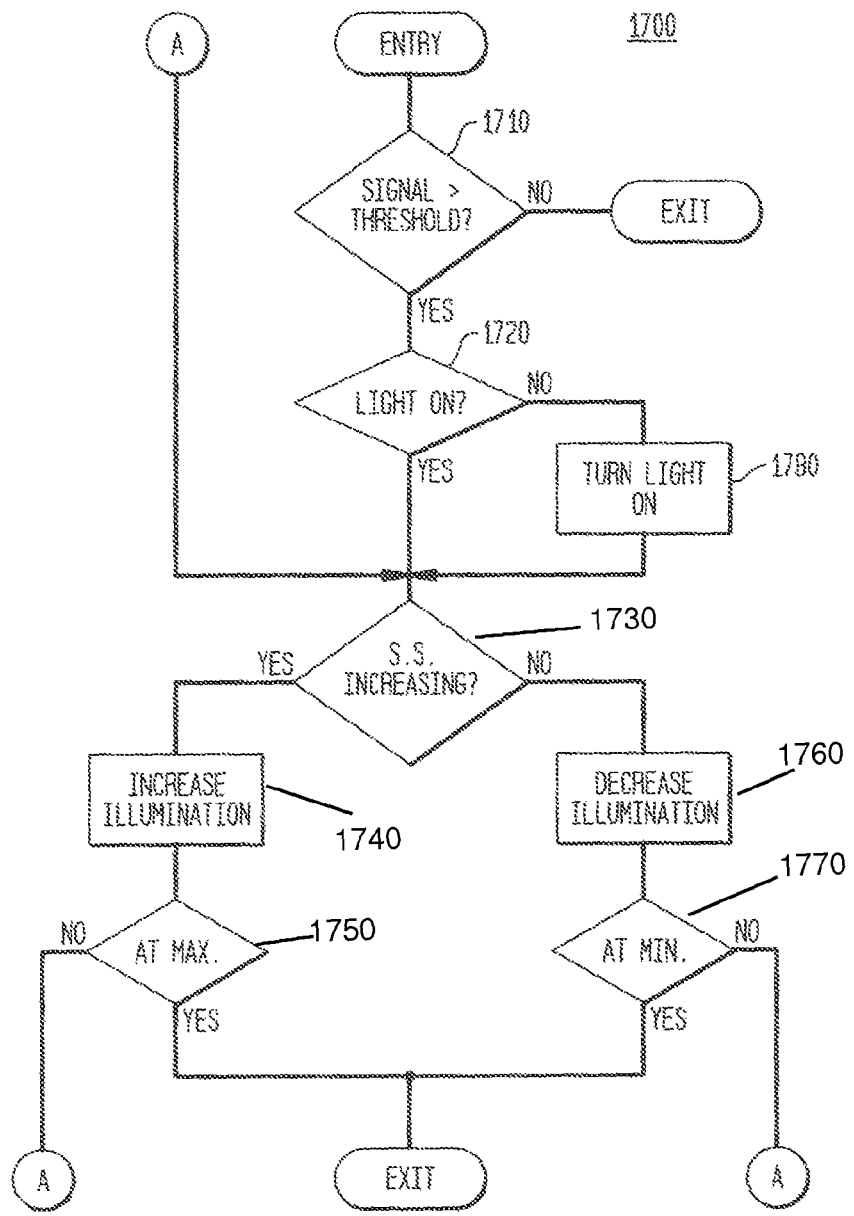

FIGS. 15-17 illustrate flow charts associated with an exemplary processes associated with the circuits shown in FIG. 14.

FIG. 15 illustrates a flow chart of a process 1500 when a reflected infra-red voltage is detected to be above a threshold value and the detected voltage (or an indication of the detected voltage above the threshold) is applied to the one-shot circuit 1450. In this case, when the voltage is detected to be above the threshold 1430, a determination is made whether the light is on, 1520. If the light is on, then the light is turned off, 1530. Otherwise, the light is turned on, 1540.

FIG. 16 illustrates an example of a process 1600 wherein a detected signal above a threshold setting (or an indication of a detected signal above a threshold setting) is applied to the S&H circuit 1460. In this case, after a determination is made that the signal is above the threshold value, 1610, a determination is made whether the light is on, 1620. If the light is determined to be OFF, then processing continues to 1630, wherein the light is turned on. As previously described, the light may be turned on to a full illumination or may be turned on to a percentage of the full illumination.

At step 1640 a determination is made whether the signal above threshold is still above the threshold setting. If the signal is still above the threshold setting, then the illumination is increased by a known amount, 1645. A determination is then made whether the illumination is at a maximum value, 1650. If the illumination is not at a maximum value, then processing continues to determine whether the signal above threshold is still above the threshold value, 1640.

However, if the signal is not above threshold, then processing is ended, with the illumination set at the last known value.

Returning to step 1620, if the light is on, then a determination is made at 1655 whether the illumination is at a maximum value. If the illumination is at a maximum value, then the light is turned off at 1660. As previously described, the illumination may be totally turned-off or may be reduced to a minimum level to conserve battery power, while leaving the illumination device in a condition for accepting additional remote commands.

If at 1655, it is determined that the light is not at maximum illumination, then processing continues to blocks 1665, 1675, 1680 to increase the illumination until a maximum illumination occurs as long as the signal from the detecting unit remains above the threshold value. However, if the signal from the detecting unit is no longer above the threshold value (e.g., absent from being detected), then the light emitting diodes contained in housing 300 are turned-off (or reduced to minimum levels, as previously described.)

FIG. 17 illustrates an exemplary processing 1700 for when a signal detected above a threshold (or an indication of the signal above the threshold) is applied to the linear output circuit. In this case, a determination is made at 1710 whether the signal is above a threshold value. When a determination is made that the signal is above the threshold value, a determination is made whether the light is on, 1720. If the light is off, then the light is turned on at 1780.

Otherwise, a determination is made whether the signal strength of the signal above threshold is increasing 1730. If the signal strength is determined to be increasing, then the illumination is increased (e.g., proportionally) 1740 until a maximum illumination 1750. However, if the signal strength is determined to be decreasing, 1760, then a determination is made whether the illumination is at a minimum value 1770. When the illumination is a maximum value or a minimum value, then processing is ended.

FIG. 18 illustrates an exemplary processing 1800 for determining direction of detection of a signal(s) in accordance with the embodiment shown in FIG. 11D. In this exemplary process, a determination is made whether the detected signal is above a threshold value, 1810. If the signal is determined to be above the threshold value, then a time of detection and a detection unit number is recorded, 1820. For as long as the signal is above the threshold value 1840 (which may be determined by polling the signal) the time and detection unit number are recorded at block 1830. When the signal is below the threshold, 1830, then a determination is made when the signal is detected again above the threshold, 1840. If the signal is detected again above the threshold level, 1840, then the time of detection and the detector unit number are recorded, 1850. For as long as the signal is above the threshold value 1860 (which may be determined by polling the signal) the time and detection unit number are recorded 1850.

After detection of a reflected signal by at least two detecting units has been completed, then a determination is made whether the time of the first detecting unit is earlier then the time of the second detecting unit 1865. If the time of the first detecting unit is earlier then the second unit, 1865, and the number of the first detecting unit is less than the second detecting unit 1870, then a determination of left-to-right movement is made 1875. Processing may continue to increase (or decrease) the illumination as required. Similarly, if the number of the first detecting unit is greater than the second detecting unit, then a determination of right-to-left movement is made 1877. Processing may continue to decrease (or increase) the illumination as required.

However, if the time of the second detection is earlier than the time of the first detection 1865, then processing continues to 1880, wherein a determination of left-to-right, 1885, and right-to-left, 1887, motion is made based on which number of the detecting unit having the first and second detections. The illumination may be increased or decreased according to the determined direction of motion, as previously described.

Although the invention has been described with regard to an infra-red sensor unit, it would be recognized that the sensing unit may be an ultra-sonic sensor or an audio sensor or an RF unit. For example, an ultra-sonic signal may be transmitted and processed in a manner similar to that described with regard to an infra-red sensor and the use of an ultra-sonic sensor does not change the scope of the invention. Similarly, an audio sensor may be used to process verbal commands, such as light-on, light-up, light-down, light-off. In this case, the verbal commands may be detected by an audio receiver and processed in a manner described herein without changing the scope of the invention.

Similarly, an RF transmitting unit (FIG. 12, 1255) may be in wireless communication with a receiving unit (FIG. 12, 1265) on the battery unit packet (1260). The RF transmitting unit 1255 may provide a control signal to the battery packet 1260 to turn on or turn off the power provided by the battery packet, to the illumination device within housing 300, as previously described. Thus, the illumination provided by the illumination unit 100 in housing 300 is controlled by RF transmitting unit 1255, within sensor unit 1250. In one aspect of the invention, the sensing unit 1250 (including RF transmitting unit 1255) may be fixedly mounted or may be temporarily mounted using double-sided tape, magnets or straps. Thus, the RF transmitting unit 1255 may be conveniently positioned so that the sensing unit (and consequently the RF transmitting unit 1255) may be engaged with an elbow, for example, and thus, avoiding contamination of the user's hands in controlling the light output of the illumination headlamp. Similarly, the sensing unit 1250 (including RF transmitting unit 1255) may be positioned on a floor so that the RF transmitting unit 1255 may be operated as a foot switch (not shown). In one aspect of the invention, the RF transmitting unit 1255 may be in communication with the RF receiving unit 1265 in the battery pack 1260 using well-known RF transmission protocols. For example, the RF transmitting unit and the RF receiving unit may be wirelessly connected using a near-field communication protocol. BLUETOOTH is a commonly used wireless communication protocol to transmit signals between transmitting and receiving units. Other types of wireless communications may be used without altering the scope of the invention (e.g., a WIFI connection, a proprietary connection). In the proprietary connection, designated near-field communication frequencies may be established between the receiving unit and transmitting unit. The power of the near-field communication frequencies may be limited to provide for distances of only a few feet of acceptable communication.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. Although the invention has been described with regard to the application of voltage, it would be within the knowledge of those skilled in the art to incorporate current devices and such devices have been contemplated by the inventors. The use of current devices in place of voltage devices does not alter the scope of the invention claimed.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. An apparatus for remotely controlling an illumination unit comprising:
    a battery unit electrically connected to said illumination unit;
    at least one transmitting unit;
    a receiving unit in communication with the battery unit, said receiving unit:
        detecting a signal generated by said at least one transmitting unit,
        generating a battery control signal in response to said detected signal generated by said at least one transmitting unit;
        providing the battery control signal to said battery unit, wherein, the battery unit alters a voltage provided to the illumination unit in response to the battery control signal.

2. The apparatus of claim 1, wherein the signal detected by the receiving unit is greater than a threshold value.

3. The apparatus of claim 1, wherein the voltage provided by the battery unit is between 0 volts and a maximum voltage.

4. The apparatus of claim 1, wherein the receiving unit further:
    determines a magnitude of the detected signal; and
    generates a level of the battery control signal based on the magnitude of the detected signal.

5. The apparatus of claim 4, wherein the level of the battery control signal is proportional to the level of the detected signal.

6. The apparatus of claim 2, wherein the threshold value is determined based on one of a plurality of preset values.

7. The apparatus of claim 1, wherein the detected signal is determined within a predetermined period of time.

8. The apparatus of claim 1, wherein the detected signal represents an average of a plurality of received signals within a predetermined period of time.

9. The apparatus of claim 1, wherein the at least one transmitting unit and the receiving unit are selected from the group consisting of: RF devices, infra-red devices, and ultra-sonic devices.

10. The apparatus of claim 1, said receiving unit further:
    determines a direction of motion based on a change in the detected signal magnitude; and
    generates a level of the battery control signal based on the determined direction of motion.

11. The apparatus of claim 1, wherein receiving unit is contained within said battery unit.

12. The apparatus of claim 1, wherein said receiving unit is wirelessly connected to said at least one transmitting unit.

13. The apparatus of claim 1, wherein said receiving unit and said at least one transmitting unit are contained within a single unit.

14. The apparatus of claim 13, wherein said receiving unit and said transmitting unit are infra-red devices.

15. An apparatus for remotely controlling an illumination unit attached to a headset, said apparatus comprising:
    a transmitting unit transmitting an RF signal;
    a receiving unit:
        receiving said RF signal;
        determining whether a strength of said RF signal exceeds a predetermined threshold value; and
        generating a control signal when said strength of said RF signal exceeds said predetermined threshold value; and
    a battery unit:
        receiving said control signal; and
        altering a voltage applied to said illumination unit to change said illumination unit from one state to another state in response to said control signal.

16. The apparatus of claim 15, wherein the illumination unit is changed from one of: an on-state to an off-state and an off-state to an on-state.

17. The apparatus of claim 15, wherein said receiving unit is contained within said battery unit.

18. The apparatus of claim 15, wherein said transmitting unit and said receiving unit are connected through a wireless connection.

19. The apparatus of claim 18, wherein said wireless connection is one of: a BLUETOOTH connection, a WIFI connection, and a proprietary connection.

* * * * *